(12) United States Patent
Reddy et al.

(10) Patent No.: US 10,051,041 B2
(45) Date of Patent: Aug. 14, 2018

(54) METHODS AND APPARATUS TO CONFIGURE HARDWARE MANAGEMENT SYSTEMS FOR USE IN VIRTUAL SERVER RACK DEPLOYMENTS FOR VIRTUAL COMPUTING ENVIRONMENTS

(71) Applicant: VMware, Inc., Palo Alto, CA (US)

(72) Inventors: Thirumalesh Reddy, San Jose, CA (US); Raj Yavatkar, Saratoga, CA (US); Sreekantha Indireddy, Cupertino, CA (US); Shreekanth Ankala, Dublin, CA (US); Rahul Kulkarni, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 153 days.

(21) Appl. No.: 14/788,004

(22) Filed: Jun. 30, 2015

(65) Prior Publication Data

US 2016/0014073 A1   Jan. 14, 2016

Related U.S. Application Data

(60) Provisional application No. 62/023,813, filed on Jul. 11, 2014.

(51) Int. Cl.
*G06F 15/177* (2006.01)
*H04L 29/08* (2006.01)
(Continued)

(52) U.S. Cl.
CPC ............ *H04L 67/10* (2013.01); *G06F 9/4416* (2013.01); *G06F 9/45558* (2013.01);
(Continued)

(58) Field of Classification Search
None
See application file for complete search history.

(56) References Cited

U.S. PATENT DOCUMENTS 7,389,300 B1   6/2008   Shah et al.
7,574,491 B2   8/2009   Stein et al.
(Continued)

FOREIGN PATENT DOCUMENTS

EP   1521172   4/2005

OTHER PUBLICATIONS

United States Patent and Trademark Office, "Non-Final Office Action," issued in connection with U.S. Appl. No. 14/796,803, dated Feb. 22, 2017, 42 pages.

(Continued)

*Primary Examiner* — Mohamed Ibrahim
(74) *Attorney, Agent, or Firm* — Hanley, Flight & Zimmerman, LLC

(57) ABSTRACT

An example method to install a hardware management system on a management switch includes in response to a power-on event of a management switch, executing a boot loader on the management switch to boot an operating system on the management switch. The example method also includes obtaining from a virtual imaging appliance in communication with the management switch a uniform resource locator of a network-accessible location of installer software to install the hardware management system. The virtual imaging appliance is to configure a physical rack of hardware for use as a virtual server rack. The hardware management system is to manage the hardware for use in the virtual server rack.

24 Claims, 11 Drawing Sheets

(51) Int. Cl.

| | | |
|---|---|---|
| *G06F 9/455* | (2018.01) | |
| *H04L 12/46* | (2006.01) | |
| *H04L 12/24* | (2006.01) | |
| *G06F 9/4401* | (2018.01) | |
| *H04L 29/06* | (2006.01) | |
| *G06F 9/50* | (2006.01) | |
| H04L 29/12 | (2006.01) | |
| H04L 12/26 | (2006.01) | |

(52) U.S. Cl.
CPC ........ *G06F 9/5077* (2013.01); *H04L 12/4675* (2013.01); *H04L 41/048* (2013.01); *H04L 41/0806* (2013.01); *H04L 41/0893* (2013.01); *H04L 41/5096* (2013.01); *H04L 67/38* (2013.01); *G06F 2009/45595* (2013.01); *H04L 41/0266* (2013.01); *H04L 41/0681* (2013.01); *H04L 41/082* (2013.01); *H04L 41/5038* (2013.01); *H04L 43/0817* (2013.01); *H04L 43/0852* (2013.01); *H04L 43/0876* (2013.01); *H04L 43/10* (2013.01); *H04L 61/2015* (2013.01); *H04L 61/2076* (2013.01)

(56) References Cited

U.S. PATENT DOCUMENTS

| | | | |
|---|---|---|---|
| 8,689,054 | B1 | 4/2014 | van der Goot |
| 8,997,098 | B2 | 3/2015 | Lee et al. |
| 9,176,764 | B1 | 11/2015 | Jorgensen |
| 2001/0029605 | A1 | 10/2001 | Forbes et al. |
| 2003/0204603 | A1 | 10/2003 | Buchanan et al. |
| 2004/0187103 | A1 | 9/2004 | Wickham et al. |
| 2005/0027843 | A1 | 2/2005 | Bozak et al. |
| 2005/0044220 | A1 | 2/2005 | Madhavan |
| 2006/0156041 | A1 | 7/2006 | Zaretsky et al. |
| 2006/0184349 | A1 | 8/2006 | Goud et al. |
| 2007/0027973 | A1* | 2/2007 | Stein ................ H04L 41/0869 709/223 |
| 2008/0201705 | A1 | 8/2008 | Wookey |
| 2009/0249284 | A1* | 10/2009 | Antosz ..................... G06F 8/10 717/104 |
| 2009/0249354 | A1 | 10/2009 | Yamaguchi et al. |
| 2009/0290501 | A1* | 11/2009 | Levy ....................... H04L 49/70 370/250 |
| 2009/0328030 | A1* | 12/2009 | Fries ......................... G06F 8/63 717/174 |
| 2010/0042723 | A1 | 2/2010 | Sundarrajan et al. |
| 2010/0070784 | A1 | 3/2010 | Gupta et al. |
| 2010/0106813 | A1 | 4/2010 | Voutilainen et al. |
| 2010/0114826 | A1 | 5/2010 | Voutilainen et al. |
| 2010/0235688 | A1 | 9/2010 | Bennah et al. |
| 2011/0029669 | A1 | 2/2011 | Chuang et al. |
| 2011/0153697 | A1* | 6/2011 | Nickolov ............... G06F 9/4856 707/827 |
| 2012/0166390 | A1 | 6/2012 | Merriman et al. |
| 2012/0179466 | A1 | 7/2012 | Huang et al. |
| 2012/0249588 | A1 | 10/2012 | Tison et al. |
| 2012/0266166 | A1 | 10/2012 | Farkas et al. |
| 2012/0303767 | A1 | 11/2012 | Renzin |
| 2014/0075179 | A1 | 3/2014 | Krishnapura et al. |
| 2014/0082202 | A1 | 3/2014 | Zhao |
| 2014/0129699 | A1 | 5/2014 | Jeftovic et al. |
| 2014/0156850 | A1 | 6/2014 | Hunt |
| 2014/0173580 | A1 | 6/2014 | McDonald et al. |
| 2014/0181294 | A1 | 6/2014 | Deshpande et al. |
| 2014/0280975 | A1 | 9/2014 | Mordani et al. |
| 2014/0282519 | A1 | 9/2014 | Apte et al. |
| 2014/0282520 | A1 | 9/2014 | Sabharwal |
| 2014/0297834 | A1 | 10/2014 | Tripathi et al. |
| 2014/0351809 | A1 | 11/2014 | Chawla et al. |
| 2014/0380308 | A1 | 12/2014 | Hassine et al. |
| 2015/0046572 | A1 | 2/2015 | Cheng et al. |
| 2015/0089496 | A1 | 3/2015 | Thankappan et al. |
| 2015/0113529 | A1 | 4/2015 | Zhong |
| 2015/0143382 | A1 | 5/2015 | Chen et al. |
| 2015/0149620 | A1 | 5/2015 | Banerjee et al. |
| 2015/0154056 | A1 | 6/2015 | Chen et al. |
| 2015/0207752 | A1 | 7/2015 | Birkestrand et al. |
| 2015/0261578 | A1 | 9/2015 | Greden et al. |
| 2015/0286935 | A1 | 10/2015 | Mukherjee et al. |
| 2016/0004696 | A1 | 1/2016 | Trenkov et al. |
| 2016/0283221 | A1 | 9/2016 | Kochar et al. |
| 2016/0371105 | A1 | 12/2016 | Sieffert et al. |

OTHER PUBLICATIONS

Pham et al., "An Evaluation of ZooKeeper for High Availability in System S," ICPE '14, Mar. 22, 2014, 11 pages.

VMware Infrastructure, "Resource Management with VMware DRS," copyright 1998-2006, VMware Inc., Palo Alto, California, 24 pages. (The latest of publication is sufficiently earlier than the effective U.S. filed so that the particular month of publication is not in issue.).

United States Patent and Trademark Office, "Non-Final Office Action," issued in connection with U.S. Appl. No. 14/788,210, dated Jun. 30, 2015, 54 pages.

VirtualRACK, An Inter Pole Enterprise, copyright 2009, http://www.virtualrack.in/, 1 page. (The year of publication is sufficiently earlier than the effective U.S. filed so that the particular month of publication is not in issue.).

VirtualRACK, "VirtualRack Overview," An Inter Pole Enterprise, copyright 2009, http://www.virtualrack.in/overview.php, 1 page. (The year of publication is sufficiently earlier than the effective U.S. filed so that the particular month of publication is not in issue.).

VirtualRACK, "Questions," An Inter Pole Enterprise, copyright 2009, http://www.virtualrack.in/questions.php, 3 pages. (The year of publication is sufficiently earlier than the effective U.S. filed so that the particular month of publication is not in issue.).

VirtualRACK, "Why VirtualRack?," An Inter Pole Enterprise, copyright 2009, http://www.virtualrack.in/why-virtualrack.php, 2 pages. (The year of publication is sufficiently earlier than the effective U.S. filed so that the particular month of publication is not in issue.).

VMware, "Using the CIM Object Space," http://pubs.vmware.com/vsphere-55/index.jsp?topic=%2Fcom.vmware.cimsdk.smashpg.doc%2F03_CIM_SMASH_PG_Use_Cases_5.1_html, retrieved on Aug. 31, 2016, 1 page.

Cisco, "Proven Savings in IT Operations," http://www.cisco.com/c/en/us/products/servers-unified-computing/ucs-manager/index.html, retrieved on Aug. 31, 2016, 2 pages.

Cisco, "Servers—Unified Computing," http://www.cisco.com/c/en/us/products/servers-unitied-computing/index.html, retrieved on Aug. 31, 2016, 3 pages.

Cisco, "Cisco UCS Faults and Error Messages Reference," http://www.cisco.com/c/en/us/td/docs/unified_computing/ucs/ts/faults/reference/ErrMess/UCS_SEMs.html, retrieved on Aug. 31, 2016, 125 pages.

Cisco, "Cisco UCS Manager Troubleshooting Reference Guide," Chapter: Troubleshooting Server Hardware Issues, http://www.cisco.com/c/en/us/td/docs/unified_computing/ucs/ts/guide/UCSTroubleshooting/UCSTroubleshooting_chapter 0111.html, retrieved on Aug. 31, 2016, 20 pages.

Cisco, "Cisco UCS C-Series Servers Integrated Management Controller CLI Configuration Guide, Release 1.3," http://www.cisco.com/c/en/us/td/docs/unified_computing/ucs/c/sw/cli/config/guide/131/b_Cisco_UCS_C-Series_CLI_Configuration_Guide_131.pdf, Mar. 11, 2011, 150 pages.

Intel, "IPMI, Intelligent Platform Management Interface Specification Second Generation V2.0," Feb. 12, 2004, http://www.intel.com/CONTENT/WWW/US/EN/SERVERS/IPMI/SECOND-GEN-INTERFACE-SPEC-V2-REV1-4.HTML, 590 pages.

The International Searching Authority, "Invitation to Pay Additional Fees," issued in connection with application No. PCT/US2016/040205, dated Oct. 20, 2016, 6 pages.

The International Searching Authority, "International Search Report and Written Opinion," issued in aonnection with application No. PCT/US2016/040205, dated Dec. 15, 2016, 19 pages.

(56) References Cited

OTHER PUBLICATIONS

United States Patent and Trademark Office, "Non-Final Office Action," issued in connection with U.S. Appl. No. 15/187,480, dated Nov. 8, 2017, 58 pages.

United States Patent and Trademark Office, "Final Office Action," issued in connection with U.S. Appl. No. 14/796,803, dated May 22, 2017, 22 pages.

United States Patent and Trademark Office, "Non-Final Office Action," issued in connection with U.S. Appl. No. 14/752,699, dated Aug. 29, 2017, 35 pages.

United States Patent and Trademark Office, "Non-Final Office Action," issued in connection with U.S. Appl. No. 15/187,452, dated Aug. 30, 2017, 30 pages.

United States Patent and Trademark Office, "Non-Final Office Action," issued in connection with U.S. Appl. No. 14/788,193 dated Septmber 25, 2017, 38 pages.

United States Patent and Trademark Office, "Non-Final Office Action," issued in connection with U.S. Appl. No. 14/796,826 dated Oct. 13, 2017, 46 pages.

United States Patent and Trademark Office, "Notice of Allowance," issued in connection with U.S. Appl. No. 14/796,803 dated Sep. 12, 2017, 45 pages.

United States Patent and Trademark Office, "Notice of Allowance," issued in connection with U.S. Appl. No. 14/752,699, dated Mar. 27, 2018, 9 pages.

United States Patent and Trademark Office, "Notice of Allowance," issued in connection with U.S. Appl. No. 14/788,193, dated Mar. 22, 2018, 13 pages.

United States Patent and Trademark Office, "Final Office Action," issued in connection with U.S. Appl. No. 15/187,452, dated Apr. 4, 2018, 19 pages.

United States Patent and Trademark Office, "Notice of Allowance," issued in connection with U.S. Appl. No. 14/796,826, dated May 15, 2018, 15 pages.

\* cited by examiner

METHODS AND APPARATUS TO CONFIGURE HARDWARE MANAGEMENT SYSTEMS FOR USE IN VIRTUAL SERVER RACK DEPLOYMENTS FOR VIRTUAL COMPUTING ENVIRONMENTS

RELATED APPLICATIONS

This patent claims the benefit of U.S. Provisional Patent Application Ser. No. 62/023,813, filed Jul. 11, 2014, entitled "VIRTUAL RACK DEPLOYMENTS FOR VIRTUAL COMPUTING ENVIRONMENTS." U.S. Provisional Patent Application Ser. No. 62/023,813 is hereby incorporated by reference herein in its entirety.

FIELD OF THE DISCLOSURE

The present disclosure relates generally to cloud computing and, more particularly, to methods and apparatus to configure hardware management systems for use in virtual server rack deployments for virtual computing environments.

BACKGROUND

Virtualizing computer systems provides benefits such as the ability to execute multiple computer systems on a single hardware computer, replicating computer systems, moving computer systems among multiple hardware computers, and so forth. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

DETAILED DESCRIPTION

Cloud computing is based on the deployment of many physical resources across a network, virtualizing the physical resources into virtual resources, and provisioning the virtual resources for use across cloud computing services and applications. When starting up a cloud computing environment or adding resources to an already established cloud computing environment, data center operators struggle to offer cost-effective services while making resources of the infrastructure (e.g., storage hardware, computing hardware, and networking hardware) work together to achieve pain-free installation/operation and optimizing the resources for improved performance. Prior techniques for establishing and maintaining data centers to provide cloud computing services often lock a data center into a single source for hardware resources because of the need to use customized virtualization software specifically designed for a particular type of hardware. Examples disclosed herein enable establishing and maintaining data centers using virtualization software that is vendor-agnostic. In this manner, data center operators are provided with the flexibility of selecting from any of a number of hardware manufacturers to meet the physical hardware needs of data centers while making it relatively easy for the data center operators to initialize, virtualize and provision new resources. That is, data center operators may use examples disclosed herein to source hardware resources from any of a number of manufacturers without requiring the data center operators to undertake the burdens of developing new software to initialize, virtualize, and provision such resources.

Figure 1:
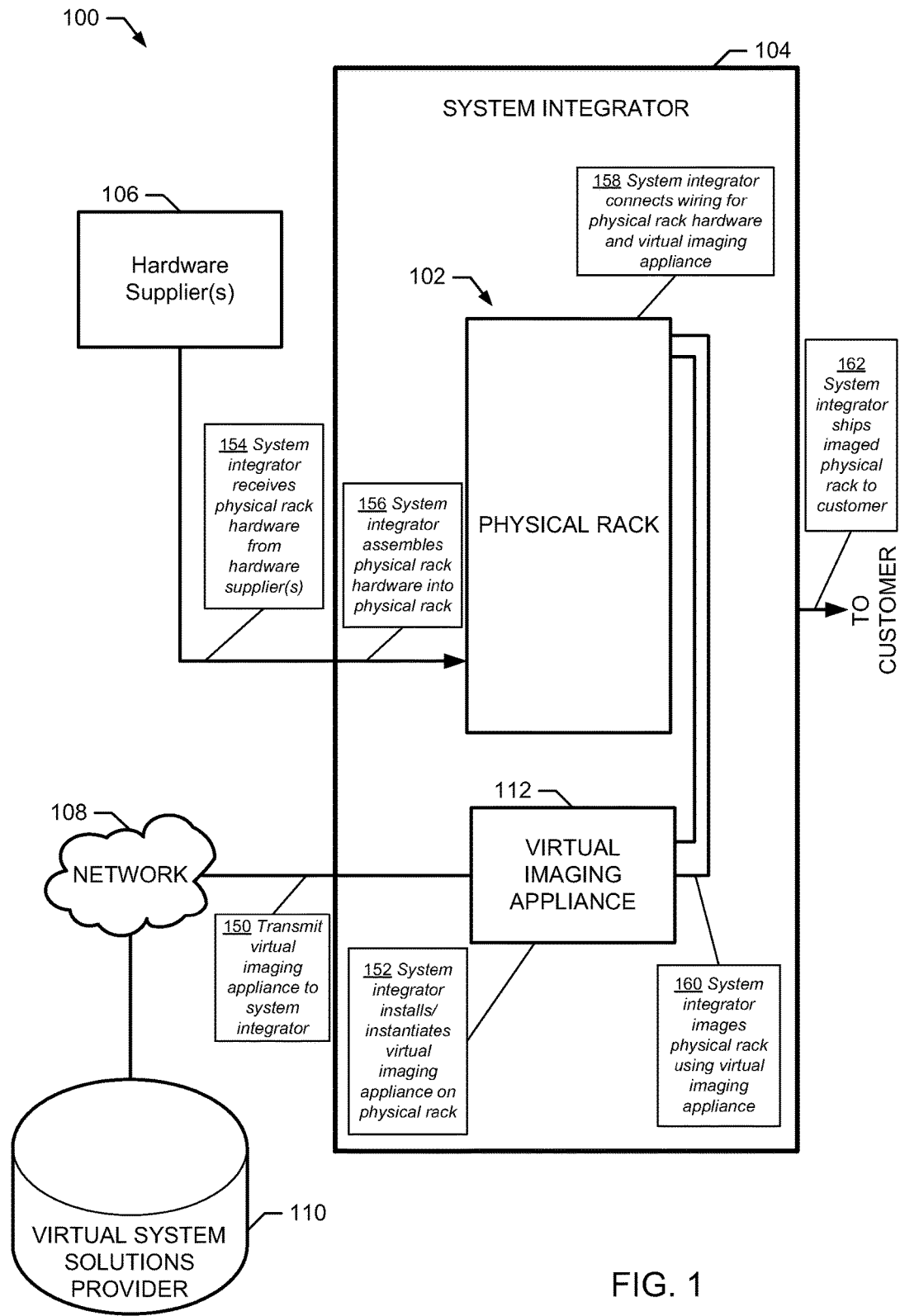
FIG. 1 depicts an example system showing components of an example physical rack deployment disclosed herein.

FIG. 1 depicts an example environment 100 in which a physical rack 102 is prepared by an example system integrator 104 for distribution to a customer. The example environment 100 includes the example physical rack 102, an example system integrator 104, an example hardware supplier(s) 106, an example network 108, an example virtual system solutions provider 110, and an example virtual imaging appliance 112.

The system integrator 104 of the illustrated example receives and fulfills customer orders for computing hardware. The system integrator 104 of the example of FIG. 1 obtains computer hardware and/or software from other suppliers, such as the example hardware supplier(s) 106, and assembles individual hardware components and/or software into functional computing units to fulfill customer orders. Alternatively, the system integrator 104 may design and/or build some or all of the hardware components and/or software to be used in assembling computing units. According to the illustrated example, the system integrator 104 prepares computing units for other entities (e.g., businesses and/or persons that do not own/employ and are not owned/employed by the system integrator 104). Alternatively, the system integrator 104 may assemble computing units for use by the same entity as the system integrator 104 (e.g., the system integrator 104 may be a department of a company, wherein the company orders and/or utilizes the assembled computing units). As used herein, the term customer refers to any person and/or entity that receives and/or operates the computing units supplied by the system integrator 104. In some examples, the system integrator 104 is an entity independent of equipment manufacturers such as white-label equipment manufacturers that provide hardware without branding. In other examples, the system integrator 104 is an original equipment manufacturer (OEM) partner or original device manufacturer (ODM) partner that partners with OEMs or ODMs (e.g., non-white label equipment manufacturers) that provide brand-labeled hardware. Example OEM/ODM hardware includes OEM/ODM Servers such as Hewlett-Packard® (HP) servers and Lenovo® servers, and OEM/ODM Switches such as Arista switches, and/or any other OEM/ODM servers, switches, or equipment that are labeled by the original manufacturers.

According to the illustrated example, one type of computing unit ordered from and/or assembled by the example system integrator 104 is the physical rack 102. The physical rack 102 is a combination of computing hardware and installed software that may be utilized by a customer to create and/or add to a virtual computing environment. For example, the physical rack 102 may include processing units (e.g., multiple blade servers), network switches to interconnect the processing units and to connect the physical rack 102 with other computing units (e.g., other ones of the physical rack 102 in a network environment such as a cloud computing environment), and/or data storage units (e.g., network attached storage, storage area network hardware, etc.). The physical rack 102 of the illustrated example is prepared by the system integrator 104 in a partially configured state to enable the computing devices to be rapidly deployed at a customer location (e.g., in less than 2 hours). For example, the system integrator 104 may install operating systems, drivers, operations software, management software, etc. The installed components may be configured with some system details (e.g., system details to facilitate intercommunication between the components of the physical rack 102) and/or may be prepared with software to collect further information from the customer when the virtual server rack is installed and first powered on by the customer.

To facilitate preparation of the physical rack 102 for distribution to a customer, the example system integrator 104 utilizes the virtual imaging appliance 112 to prepare and configure the operating systems, system configurations, software, etc. on the physical rack 102 prior to shipping the example server rack 102 to the customer. The virtual imaging appliance 112 of the illustrated example is a virtual computing appliance provided to the system integrator 104 by the example virtual system solutions provider 110 via the example network 108. The example virtual imaging appliance 112 is executed by the example system integrator 104 in a virtual computing environment of the system integrator 104. For example, the virtual imaging appliance 112 may be a virtual computing image, a virtual application, a container virtual machine image, a software application installed in an operating system of a computing unit of the system integrator 104, etc. The virtual imaging appliance 112 may alternatively be provided by any other entity and/or may be a physical computing device, may be multiple physical computing devices, and/or may be any combination of virtual and physical computing components.

The virtual imaging appliance 112 of the illustrated example retrieves software images and configuration data from the virtual systems solutions provider 110 via the network 108 for installation on the physical rack 102 during preparation of the physical rack 102. The virtual imaging appliance 112 of the illustrated example pushes (e.g., transmits, sends, etc.) the software images and configuration data to the components of the physical rack 102. For example, the virtual imaging appliance 112 of the illustrated example includes multiple network connections (e.g., virtual network connections, physical network connects, and/or any combination of virtual and network connections). For example, the virtual imaging appliance 112 of the illustrated examples connects to a management interface of a network switch(es) installed in the physical rack 102, installs network configuration information on the network switch(es), and reboots the switch(es) to load the installed configuration to communicatively couple the virtual imaging appliance 112 with the computing unit(s) communicatively coupled via the network switch(es). The example virtual imaging appliance 112 also connects to a management network interface (e.g., an out of band (OOB) interface) of a server(s) installed in the example physical rack 102 to cause an operating system(s) to be installed (e.g., utilizing a preboot execution environment (PXE) boot of an operating system installer). The example virtual imaging appliance 112 is also used to install virtual environment management components (described in further detail in conjunction with FIGS. 3-6 and in the following pages) and causes the virtual environment management components to boot so that they can take over the deployment of the example server rack 102.

The example virtual imaging appliance 112 is configured to perform many operations of the deployment without user intervention and without the need for a user of the example system integrator 104 to manually connect to the various interfaces of the components of the example physical rack 102. Furthermore, the user of the example virtual imaging appliance 112 is freed from the burden of locating the various software images that may be needed to configure the example physical rack 102 (e.g., firmware images for the network switch(es), operating system images for the server(s), operating system driver(s) for hardware components installed in the physical rack 102, etc.). Additionally, the virtual environment management components deployed by the example virtual imaging appliance 112 are configured by the virtual imaging appliance 112 to facilitate easy deployment of the physical rack 102 at the customer location. For example, the virtual management components installed on the physical rack 102 by the example virtual imaging appliance 112 include graphical user interfaces that guide a customer through the process of inputting configuration parameters (e.g., details of the customer's network, information about existing virtual environments, etc.). In addition, the example virtual management components automatically discover some information about the customer's system (e.g., automatically discover information about existing virtual environments).

The network 108 of the illustrated example communicatively couples the example system integrator 104 with the virtual system solutions provider 110. According to the illustrated example, the network 108 is the Internet. Alternatively, the network 108 may be any type of local network, wide area network, wireless network, wired network, any combination of networks, etc.

The virtual system solutions provider 110 of the illustrated example is a business that distributes (e.g., sells) the example virtual imaging appliance 112. The virtual system solutions provider 110 of the illustrated example also provides a repository of images and/or other types of software (e.g., virtual machine images, drivers, operating systems, etc.) that may be retrieved by the virtual imaging appliance 112 and installed on the physical rack 102. The virtual system solutions provider 110 may alternatively be implemented by multiple entities (e.g., from a manufacturer(s) of the software) and/or any other type of entity.

An example operation process utilized by the example system integrator 104 is illustrated by blocks 150-162 of FIG. 1. The example process begins when the example virtual system solutions provider 110 transmits the virtual imaging appliance 112 to the example system integrator 104 via the example network 108 (block 150). According to the illustrated example, the virtual imaging appliance 112 is a system image that is transmitted to the system integrator 104 to be implemented on computing hardware provided by the system integrator 104. Alternatively, the virtual imaging appliance 112 may be computing hardware and software that is assembled by the virtual system solutions provider 110 and shipped or otherwise delivered to the system integrator 104.

The example system integrator 104 installs and/or instantiates the virtual imaging appliance on computing resources (block 152). For example, the virtual imaging appliance 112 may be a virtual machine image that is installed in a virtual machine environment (e.g., a VMware® virtual machine disk, an open virtualization format (OVF) image, etc.).

The example system integrator 104 then receives virtual server rack hardware for assembling the physical rack 102 from the example hardware supplier(s) 106 (block 154). While, according to the illustrated example, the example system integrator 104 receives the virtual server rack hardware after receiving and installing the virtual imaging appliance 112, the system integrator 104 may alternatively receive the virtual server rack hardware at any other time (e.g., prior to receiving and/or installing the virtual imaging appliance 112).

After receiving the virtual server rack hardware from the example hardware supplier(s) 106, the example system integrator 104 assembles the virtual server rack hardware into a physical server rack (block 156). Alternatively, the virtual server rack hardware may not be assembled into a server rack (e.g., the virtual server rack hardware could be assembled in another type of computing hardware such as a computer case and/or may be computing hardware that will be communicatively coupled but not installed in a rack). The example system integrator 104 then connects wiring for the physical rack 102 to communicatively couple the components of the physical rack 102 and to communicatively couple the physical rack 102 to the example virtual imaging appliance 112 (block 158).

Next, the example system integrator 104 utilizes the example virtual imaging appliance 112 to image operating systems, drivers, management systems, software, etc. onto the physical rack 102 (block 160). The example images may be retrieved from the virtual system solutions provider 110 via the example network 108 and/or may be retrieved from a local repository or other source. The example system integrator 104 may additionally power on the physical rack 102 and perform testing to verify that the hardware is operating properly and/or that the images transferred to the physical rack 102 are operating properly.

After imaging the physical rack 102, the example system integrator 104 ships and/or otherwise delivers the physical rack 102 to the customer (block 162). Thus, the physical rack 102 has been pre-configured to allow the customer to power on the example physical rack 102 and quickly prepare the physical rack 102 for installation in a new and/or existing computing system (e.g., a cloud computing system). For example, upon initially powering on the example physical rack 102, the components of the example physical rack 102 are already configured to communicate with each other and execute operating systems and software, which allows the example physical rack 102 to provide an interface (e.g., a webpage interface) that, when accessed by the customer or an installer, gathers additional information for completing the configuration of the physical rack 102. For example, the interface may gather and/or configure user credentials, network information, information about networked components (e.g., an address for a storage device such as a storage area network (SAN), an address for a management system (e.g., a VMware vCenter server(s)), etc.). The gathered information can be utilized by the components of the example physical rack 102 to setup the physical rack 102 as a part of a new computing cluster and/or add the example physical rack 102 to an existing computing cluster (e.g., a cloud computing system).

While an example process is described in conjunction with blocks 150-162, any other process may be utilized. The order of the blocks may be changed. For example, the system integrator may receive and assemble the hardware for the example physical rack 102 (blocks 154-156) prior to receiving and/or installing the virtual imaging appliance 112. Furthermore, once the example system integrator 104 has received the example virtual imaging appliance 112, the system integrator 104 may assemble and/or image (block 154-160) multiple ones of the physical rack 102 using that same virtual imaging appliance 112.

Figure 2:
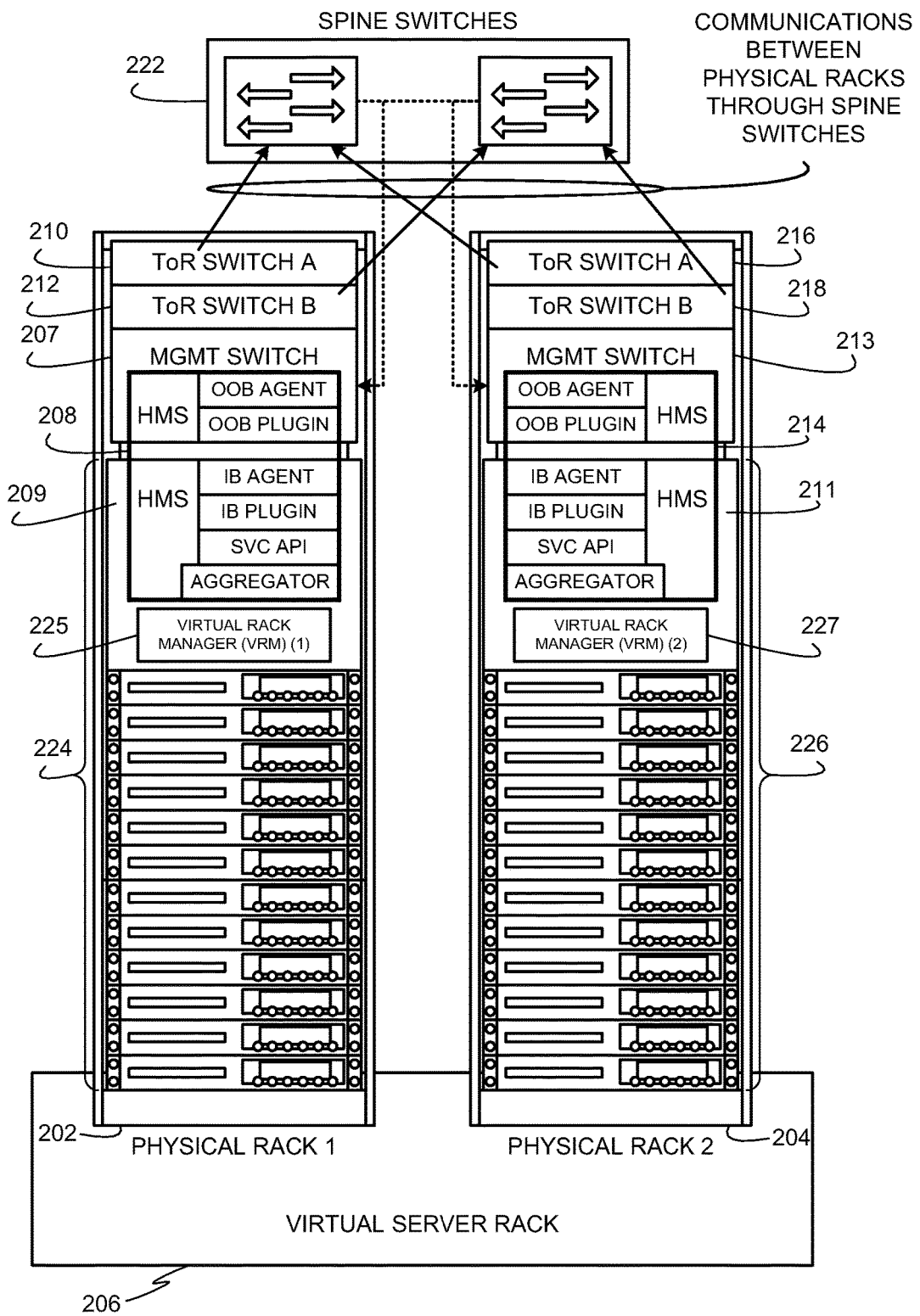
FIG. 2 depicts example physical racks in an example virtual server rack deployment.

FIG. 2 depicts example physical racks 202, 204 in an example deployment of a virtual server rack 206. For example, the physical racks 202, 204 may be ones of the physical rack 102 assembled by the example system integrator 104 of FIG. 1. In the illustrated example, the first physical rack 202 has an example top-of-rack (ToR) switch A 210, an example ToR switch B 212, an example management switch 207, and an example server host node(0) 209. In the illustrated example, the management switch 207 and the server host node(0) 209 run a hardware management system (HMS) 208 for the first physical rack 202. The second physical rack 204 of the illustrated example is also provided with an example ToR switch A 216, an example ToR switch B 218, an example management switch 213, and an example server host node(0) 211. In the illustrated example, the management switch 213 and the server host node (0) 211 run an HMS 214 for the second physical rack 204.

In the illustrated example, the management switches 207, 213 of the corresponding physical racks 202, 204 run corresponding out-of-band (OOB) agents (e.g., an example OOB agent 612 described below in connection with FIG. 6) and OOB plugins (e.g., an example OOB plugin 621 described below in connection with FIG. 6) of the corresponding HMSs 208, 214. Also in the illustrated example, the server host nodes(0) 209, 211 of the corresponding physical racks 202, 204 run corresponding IB agents (e.g., an example IB agent 613 described below in connection with FIG. 6), IB plugins (e.g., an example IB plugin 623 described below in connection with FIG. 6), HMS service APIs (e.g., an example generic HMS service API 610 described below in connection with FIG. 6), and aggregators (e.g., an example HMS aggregator 611 described below in connection with FIG. 6).

In the illustrated example, the HMS 208, 214 connects to server management ports of the server host node(0) 209, 211 (e.g., using a baseboard management controller (BMC)), connects to ToR switch management ports (e.g., using 1 Gbps links) of the ToR switches 210, 212, 216, 218, and also connects to spine switch management ports of one or more spine switches 222. These example connections form a non-routable private Internet protocol (IP) management network for OOB management. The HMS 208, 214 of the illustrated example uses this OOB management interface to the server management ports of the server host node(0) 209, 211 for server hardware management. In addition, the HMS 208, 214 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server network interface card (NIC) ports (e.g., using 10 Gbps links) of server hosts in the physical racks 202, 204 for downlink communications and to the spine switch(es) (e.g., using 40 Gbps links) for uplink communications. In the illustrated example, the management switch 207, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 208, 214 is provided with IB connectivity to individual server nodes (e.g., server nodes in example physical hardware resources 224, 226) of the physical rack 202, 204. In the illustrated example, the IB connection interfaces to physical hardware resources 224, 226 via an operating system running on the server nodes using an OS-specific API such as vSphere API, command line interface (CLI), and/or interfaces such as Common Information Model from Distributed Management Task Force (DMTF).

The HMSs 208, 214 of the corresponding physical racks 202, 204 interface with virtual rack managers (VRMs) 225, 227 of the corresponding physical racks 202, 204 to instantiate and manage the virtual server rack 206 using physical hardware resources 224, 226 (e.g., processors, network interface cards, servers, switches, storage devices, peripherals, power supplies, etc.) of the physical racks 202, 204. In the illustrated example, the VRM 225 of the first physical rack 202 runs on three server host nodes of the first physical rack 202, one of which is the server host node(0) 209. As used herein, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. Also in the illustrated example, the VRM 227 of the second physical rack 204 runs on three server host nodes of the second physical rack 204, one of which is the server host node(0) 211. In the illustrated example, the VRMs 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

In examples disclosed herein, a command line interface (CLI) and APIs are used to manage the ToR switches 210, 212, 216, 218. For example, the HMS 208, 214 uses CLI/APIs to populate switch objects corresponding to the ToR switches 210, 212, 216, 218. On HMS bootup, the HMS 208, 214 populates initial switch objects with statically available information. In addition, the HMS 208, 214 uses a periodic polling mechanism as part of an HMS switch management application thread to collect statistical and health data from the TOR switches 210, 212, 216, 218 (e.g., Link states, Packet Stats, Availability, etc.). There is also a configuration buffer as part of the switch object which stores the configuration information to be applied on the switch.

Figure 3:
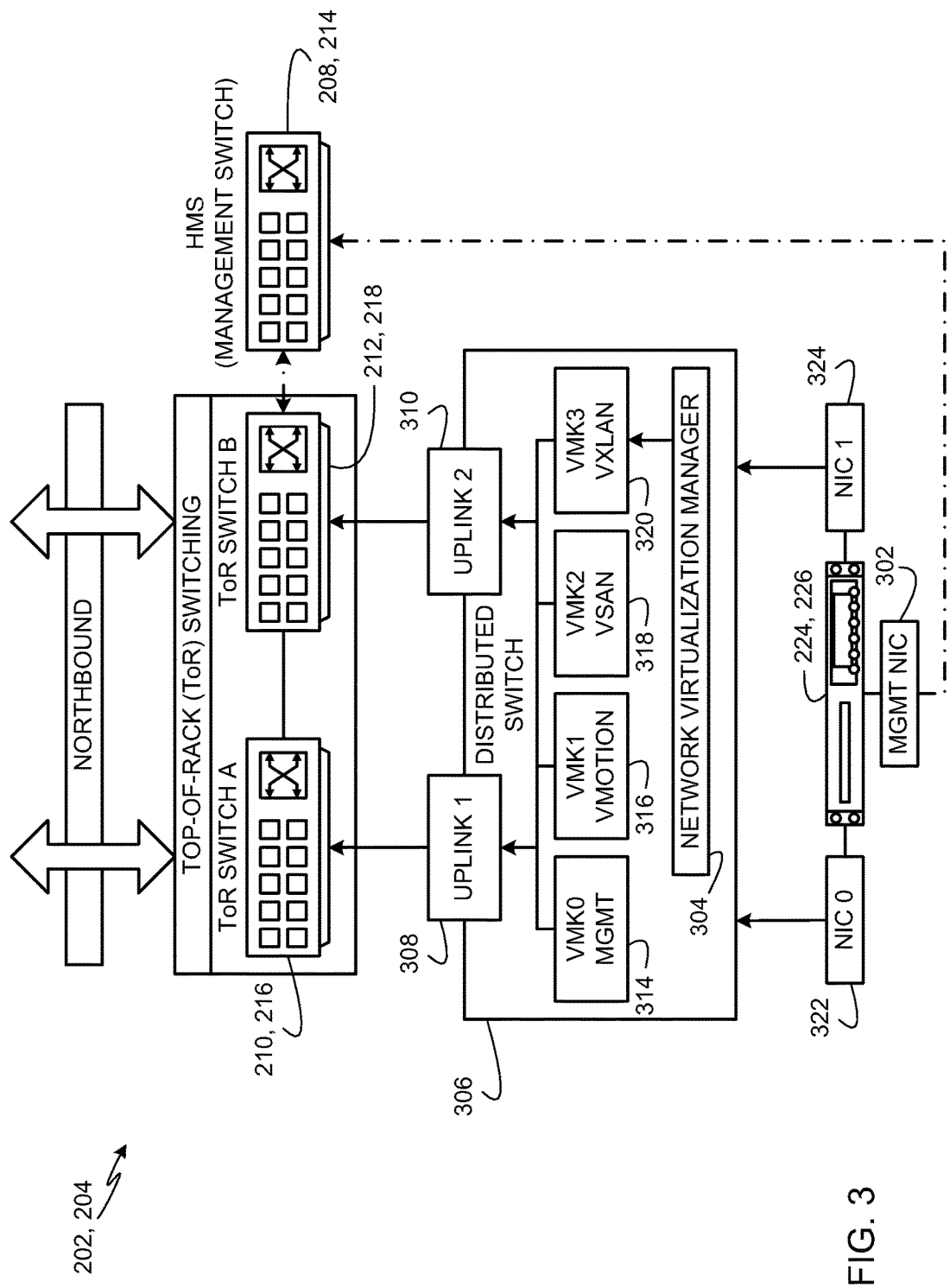
FIG. 3 depicts an example configuration of one of the example physical racks of FIG. 2.

FIG. 3 depicts an example configuration of one of the example physical racks 202, 204 of FIG. 2. In the illustrated example of FIG. 3, the HMS 208, 214 is in communication with a physical hardware resource 224, 226 through a management network interface card (NIC) 302. The example HMS 208, 214 is also shown in communication with the example ToR switches 210, 216, 212, 218. The example ToR switches 210, 216, 212, 218 are in communication with a distributed switch 306 through multiple uplink ports 308, 310 of the distributed switch 306. In the illustrated example, the uplink ports 308, 310 are implemented using separate network interface cards (NICs).

In the illustrated example, the distributed switch 306 runs numerous virtual adapters known as virtual machine kernels (VMKs) including an example VMK0 management kernel 314, an example VMK1 vMotion kernel 316, an example VMK2 vSAN kernel 318, and an example VMK3 VXLAN 320. The VMK0 management kernel 314 virtual adapter is software executed by the distributed switch 306 to manage use of ones of or portions of the physical hardware resources 224, 226 allocated for use by the distributed switch 306. In examples disclosed herein, the VRM1 225 of FIG. 2 uses the VMK0 management kernel 314 to communicate with the VRM2 227 through the spine switches 222 of FIG. 2. The VMK1 vMotion 316 virtual adapter is software executed by the distributed switch 306 to facilitate live migration of virtual machines between physical hardware resources 224, 226 with substantially little or no downtime to provide continuous service availability from the virtual machines being migrated. The VMK2 vSAN 318 virtual adapter is software executed by the distributed switch 306 to aggregate locally attached data storage disks in a virtual cluster to create a storage solution that can be provisioned from the distributed switch 306 during virtual machine provisioning operations. The example VMK3 VXLAN 320 is virtual adapter software executed by the distributed switch to establish and/or support one or more virtual networks provisioned in the distributed switch 306. In the illustrated example, the VMK3 VXLAN 320 is in communication with an example network virtualization manager 304. The network virtualization manager 304 of the illustrated example virtualizes network resources such as physical hardware switches to provide software-based virtual networks. The example network virtualization manager 304 may be implemented using, for example, the VMware NSX network virtualization platform. In the illustrated example of FIG. 3, the distributed switch 306 is shown interfacing with one or more of the physical hardware resources 224, 226 through multiple NICs 322, 324. In this manner, the VM kernels 314, 316, 318, 320 can instantiate virtual resources based on one or more, or portions of, the physical hardware resources 224, 226.

The HMS 208, 214 of the illustrated examples of FIGS. 2 and 3, is a stateless software agent responsible for managing individual hardware elements in a physical rack 202, 204. Examples of hardware elements that the HMS 208, 214 manages are servers and network switches in the physical rack 202, 204. In the illustrated example, the HMS 208, 214 is implemented using Java on Linux so that an OOB portion (e.g., the OOB agent 612 of FIG. 6) of the HMS 208, 214 run as a Java application on a white box management switch (e.g., the management switch 207, 213) in the physical rack 202, 204. However, any other programming language and any other operating system may be used to implement the HMS 208, 214. The physical hardware resources 224, 226 that the HMS 208, 214 manages include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, the HMS 208, 214 may also be used to manage non-white label equipment such as original equipment manufacturer (OEM) equipment. Such OEM equipment includes OEM Servers such as Hewlett-Packard® (HP) servers and Lenovo® servers, and OEM Switches such as Arista switches, and/or any other OEM server, switches, or equipment.

Figure 4:
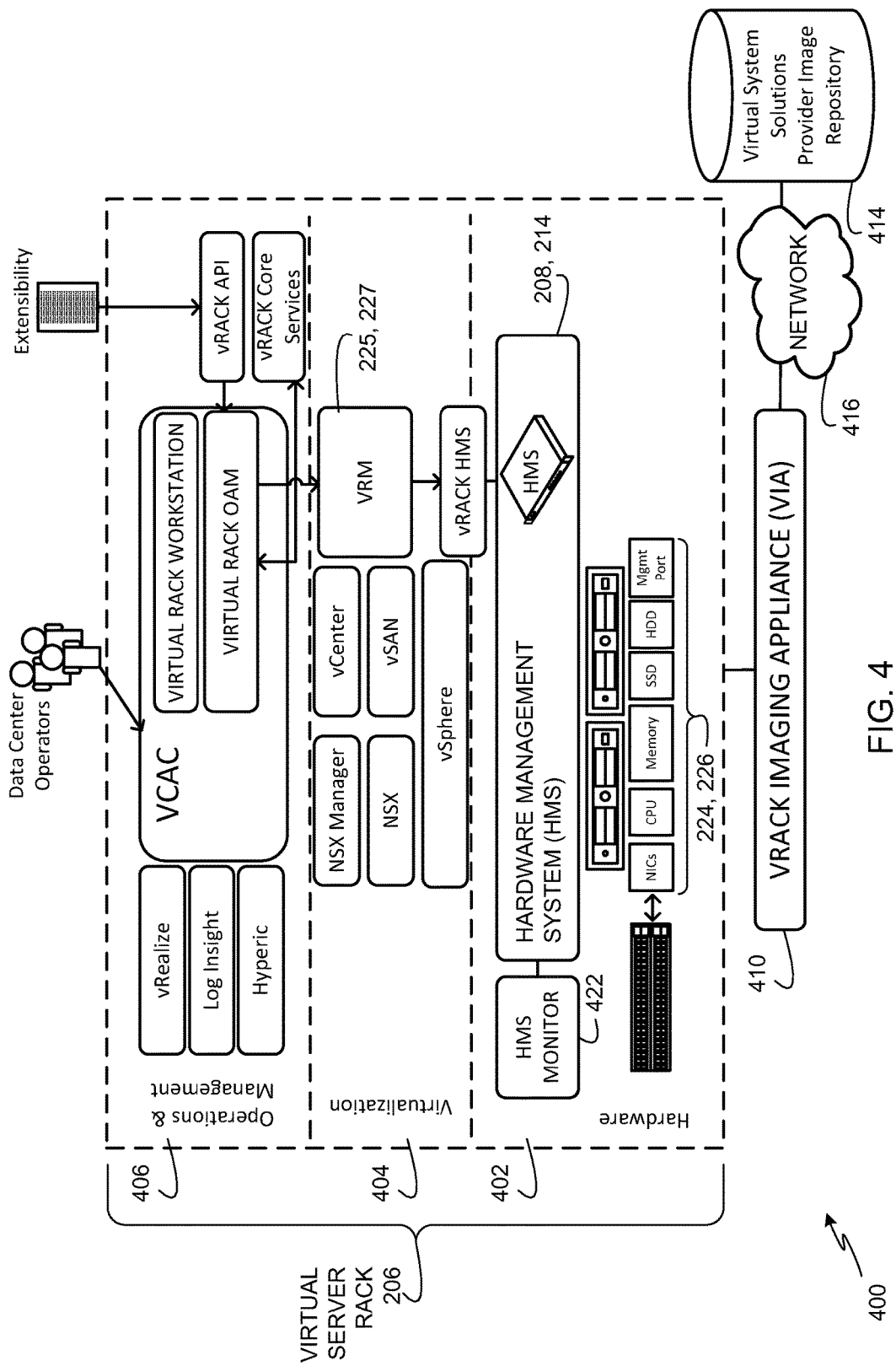
FIG. 4 depicts an example architecture to configure and deploy the example virtual server rack of FIG. 2.

FIG. 4 depicts an example architecture 400 in which an example virtual imaging appliance 410 (e.g., the example virtual imaging appliance 112 of FIG. 1) is utilized to configure and deploy the virtual server rack 206 (e.g., one or more of the example physical rack 102 of FIG. 1).

The example architecture 400 of FIG. 4 includes a hardware layer 402, a virtualization layer 404, and an operations and management layer 406. In the illustrated example, the hardware layer 402, the virtualization layer 404, and the operations and management layer 406 are part of the example virtual server rack 206 of FIG. 2. The virtual server rack 206 of the illustrated example is based on the physical racks 202, 204 of FIG. 2. Additionally or alternatively, the virtual server rack 206 may be based on the physical rack 102 of FIG. 1. For example, the physical rack 102 may be configured to be in communication with the physical racks 202, 204 to form part of the virtual server rack 206. Alternatively, any one of the physical racks 102, 202, 204 may be operated in a stand-alone manner to instantiate and run the virtual server rack 206. The example virtual server rack 206 is configured to configure the physical hardware resources 224, 226, to virtualize the physical hardware resources 224, 226 into virtual resources, to provision virtual resources for use in providing cloud-based services, and to maintain the physical hardware resources 224, 226 and the virtual resources. The example architecture 400 includes a virtual imaging appliance (VIA) 410 that communicates with the hardware layer 402 to store operating system (OS) and software images in memory of the hardware layer 402 for use in initializing physical resources needed to configure the virtual server rack 206. In the illustrated example, the VIA 410 retrieves the OS and software images from a virtual system solutions provider image repository 414 via an example network 416. For example, the VIA 410 may be the virtual imaging appliance 112 provided to the system integrator 104 of FIG. 1 by the example virtual system solutions provider 110 of FIG. 1 to configure new physical racks (e.g., the physical rack 102 of FIG. 1 and/or the physical racks 202, 204 of FIGS. 2 and 3) for use as virtual server racks (e.g., the virtual server rack 206). That is, whenever the system integrator 104 wishes to configure new hardware (e.g., a new physical rack) for use as a virtual server rack, the system integrator 104 connects the VIA 410 to the new hardware, and the VIA 410 communicates with the virtual system provider image repository 414 to retrieve OS and/or software images needed to configure the new hardware for use as a virtual server rack. In the illustrated example, the OS and/or software images located in the virtual system provider image repository 414 are configured to provide the system integrator 104 with flexibility in selecting to obtain hardware from any of a number of hardware manufacturers. As such, end users can source hardware from multiple hardware manufacturers without needing to develop custom software solutions for each hardware manufacturer. Further details of the example VIA 410 are disclosed in U.S. patent application Ser. No. 14/752,699, filed on Jun. 26, 2015, and titled "Methods and Apparatus for Rack Deployments for Virtual Computing Environments," which is hereby incorporated herein by reference in its entirety.

The example hardware layer 402 of FIG. 4 includes the HMS 208, 214 of FIGS. 2 and 3 that interfaces with the physical hardware resources 224, 226 (e.g., processors, network interface cards, servers, switches, storage devices, peripherals, power supplies, etc.). The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208, 214 also supports rack-level boot-up sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 102, 202, 204 including the dual-redundant management switches 207, 213 and dedicated management ports attached to the server host nodes(0) 209, 211 and the ToR switches 210, 212, 216, 218 (FIGS. 2 and 3). In the illustrated example, one instance of the HMS 208, 214 runs per physical rack 102, 202, 204. For example, the HMS 208, 214 may run on the management switch 207, 213 and the server host node(0) 209, 211 installed in the example physical rack 102 of FIG. 1. In the illustrated example of FIG. 2 both of the HMSs 208, 214 are provided in corresponding management switches 207, 213 and the corresponding server host nodes(0) 209, 211 as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch 207, 213 and/or a failure of the server host nodes(0) 209, 211 on which the other HMS 208, 214 executes. In some examples, to achieve seamless failover, two instances of an HMS 208, 214 run in a single physical rack 102, 202, 204. In such examples, the physical rack 102, 202, 204 is provided with two management switches, and each of the two management switches runs a separate instance of the HMS 208, 214. In such examples, the physical rack 202 of FIG. 2 runs two instances of the HMS 208 on two separate physical hardware management switches and two separate server host nodes(0), and the physical rack 204 of FIG. 2 runs two instances of the HMS 214 on two separate physical hardware management switches and two separate server host nodes(0). In this manner, for example, one of the instances of the HMS 208 on the physical rack 202 serves as the primary HMS 208 and the other instance of the HMS 208 serves as the secondary HMS 208. The two instances of the HMS 208 on two separate management switches and two separate server host nodes(0) in the physical rack 202 (or the two instances of the HMS 214 on two separate management switches and two separate server host nodes(0) in the physical rack 204) are connected over a point-to-point, dedicated Ethernet link which carries heartbeats and memory state synchronization between the primary and secondary HMS instances.

There are numerous categories of failures that the HMS 208, 214 can encounter. Some example failure categories are shown below in Table 1.

TABLE 1

HMS Failure Categories

| Failure Type | Examples | Impact | Remediation |
| --- | --- | --- | --- |
| 1. HMS Agent Software Failures | Unable to allocate new resources Memory corruption Software Crash CPU hogging Memory leaks | Short term loss of HMS function [Minutes] | Restart from Monitor |
| 2. HMS Agent Unrecoverable Software Failure | Unable to start demon Unable to resolve Failure Type 1 Consistent software crash | Longer term loss of HMS function [Hours] | Maintenance mode thin HMS Agent till issue resolved |
| 3. Management Switch Operating System Software Failures | Processes Failures Kernel Failures Unable to boot switch OS ONIE/ bootloader issues | Short to Long Term Loss of Mgmt Switch and HMS function | Process restart for user processes. Reboots for Kernel failures Manual intervention for failed boots |
| 4. Management Switch Hardware Failures | Link down on management ports to Server Link Down on management ports to ToR nodes Link down from VRM Host to HMS on Mgmt Switch Critical Hardware alarms | Portions of rack unavailable VRM-HMS communication loss | Reset Links from PRM Notify VRM for manual intervention |
| 5. Management Switch Un-Recoverable Hardware Failure | Management switch fails to boot Erratic Resets of hardware while running | Long term loss of HMS/ Mgmt Switch | Manual intervention or standby switch |

In the illustrated example of FIG. 4, the hardware layer 402 includes an example HMS monitor 422 to monitor the operational status and health of the HMS 208, 214. The example HMS monitor 422 is an external entity outside of the context of the HMS 208, 214 that detects and remediates failures in the HMS 208, 214. That is, the HMS monitor 422 is a process that runs outside the HMS daemon to monitor the daemon. For example, the HMS monitor 422 can run alongside the HMS 208, 214 in the same management switch 207, 213 as the HMS 208, 214. The example HMS monitor 422 is configured to monitor for Type 1 failures of Table 1 above and restart the HMS daemon when required to remediate such failures. The example HMS monitor 422 is also configured to invoke a HMS maintenance mode daemon to monitor for Type 2 failures of Table 1 above. In examples disclosed herein, an HMS maintenance mode daemon is a minimal HMS agent that functions as a basic backup of the HMS 208, 214 until the Type 2 failure of the HMS 208, 214 is resolved.

The example virtualization layer 404 includes the virtual rack manager (VRM) 225, 227. The example VRM 225, 227 communicates with the HMS 208, 214 to manage the physical hardware resources 224, 226. The example VRM 225, 227 creates the example virtual server rack 206 out of underlying physical hardware resources 224, 226 that may span one or more physical racks (or smaller units such as a hyper-appliance or half rack) and handles physical management of those resources. The example VRM 225, 227 uses the virtual server rack 206 as a basis of aggregation to create and provide operational views, handle fault domains, and scale to accommodate workload profiles. The example VRM 225, 227 keeps track of available capacity in the virtual server rack 206, maintains a view of a logical pool of virtual resources throughout the SDDC life-cycle, and translates logical resource provisioning to allocation of physical hardware resources 224, 226. The example VRM 225, 227 interfaces with components of the virtual system solutions provider 110 (FIG. 1) such as vSphere®, vCenter™ and NSX™ manager, and presents the logical view of underlying resources such as hosts and clusters. The example VRM 225, 227 also uses the logical view for orchestration and provisioning of workloads. Additional details of the VRM 225, 227 are disclosed below in connection with FIG. 5.

The virtualization layer 404 of the illustrated example, and its associated components are configured to run virtual machines. However, in other examples, the virtualization layer 404 may additionally or alternatively be configured to run containers. A virtual machine is a data computer node that operates with its own guest operating system on a host using resources of the host virtualized by virtualization software. A container is a data computer node that runs on top of a host operating system without the need for a hypervisor or separate operating system.

The virtual server rack 206 of the illustrated example enables abstracting the physical hardware resources 224, 226. In some examples, the virtual server rack 206 includes a set of physical units (e.g., one or more racks) with each unit including hardware 224, 226 such as server nodes (e.g., compute+storage+network links), network switches, and, optionally, separate storage units. From a user perspective, the example virtual server rack 206 is an aggregated pool of logic resources exposed as one or more vCenter ESXi™ clusters along with a logical storage pool and network connectivity.

In the illustrated example, the example OAM layer 406 is an extension of a VMware vCloud® Automation Center (VCAC) that relies on the VCAC functionality and also leverages utilities such as vRealize, Log Insight™, and Hyperic® to deliver a single point of SDDC operations and management. The example OAM layer 406 is configured to provide different services such as heat-map service, capacity planner service, maintenance planner service, events and operational view service, and virtual rack application workloads manager service.

In the illustrated example, a heat map service of the OAM layer 406 exposes component health for hardware mapped to virtualization and application layers (e.g., to indicate good, warning, and critical statuses). The example heat map service also weighs real-time sensor data against offered service level agreements (SLAs) and may trigger some logical operations to make adjustments to ensure continued SLA.

In the illustrated example, the capacity planner service of the OAM layer 406 checks against available resources and looks for potential bottlenecks before deployment of an application workload. Example capacity planner service also integrates additional rack units in the collection/stack when capacity is expanded.

In the illustrated example, the maintenance planner service of the OAM layer 406 dynamically triggers a set of logical operations to relocate virtual machines (VMs) before starting maintenance on a hardware component to increase the likelihood of substantially little or no downtime. The example maintenance planner service of the OAM layer 406 creates a snapshot of the existing state before starting maintenance on an application. The example maintenance planner service of the OAM layer 406 automates software upgrade/maintenance by creating a clone of the machines and proceeds to upgrade software on clones, pause running machines, and attaching clones to a network. The example maintenance planner service of the OAM layer 406 also performs rollbacks if upgrades are not successful.

In the illustrated example, an events and operational views service of the OAM layer 406 provides a single dashboard for logs by feeding to Log Insight. The example events and operational views service of the OAM layer 406 also correlates events from the heat map service against logs (e.g., a server starts to overheat, connections start to drop, lots of HTTP/503 from App servers). The example events and operational views service of the OAM layer 406 also creates a business operations view (e.g., a top down view from Application Workloads=>Logical Resource View=>Physical Resource View). The example events and operational views service of the OAM layer 406 also provides a logical operations view (e.g., a bottom up view from Physical resource view=>vCenter ESXi Cluster View=>VM's view).

In the illustrated example, the virtual rack application workloads manager service of the OAM layer 406 uses vCAC and vCAC enterprise services to deploy applications to vSphere hosts. The example virtual rack application workloads manager service of the OAM layer 406 uses data from the heat map service, the capacity planner service, the maintenance planner service, and the events and operational views service to build intelligence to pick the best mix of applications on a host (e.g., not put all high CPU intensive apps on one host). The example virtual rack application workloads manager service of the OAM layer 406 optimizes applications and virtual storage area network (vSAN) arrays to have high data resiliency and best possible performance at same time.

Figure 5:
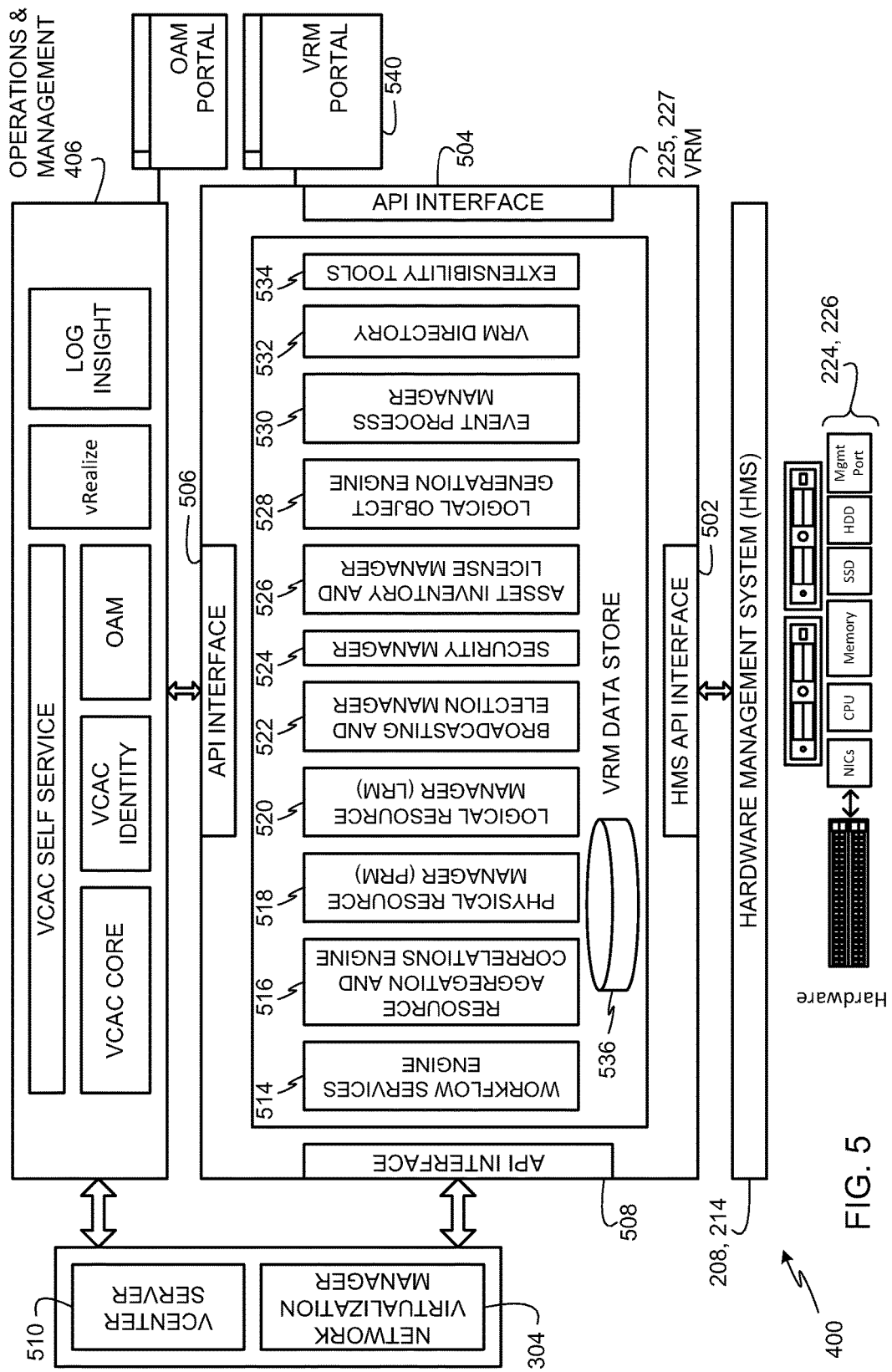
FIG. 5 depicts the example hardware management system (HMS) of FIGS. 2-4 interfacing between the example hardware and an example virtual resource manager (VRM) of FIGS. 2 and 4.

FIG. 5 depicts another view of the example architecture 400 of FIG. 4 showing the example HMS 208, 214 of FIGS. 2-4 interfacing between the example physical hardware resources 224, 226 of FIGS. 2-4 and the example VRM 225, 227 of the example architecture 400 of FIG. 4. In the illustrated example, the VRM 225, 227 includes numerous application program interfaces (APIs) 502, 504, 506, 508 to interface with other components of the architecture 400. The APIs 502, 504, 506, 508 of the illustrated example include routines, protocols, function calls, and other components defined for use by external programs, routines, or components to communicate with the VRM 225, 227. Such communications may include sending information to the VRM 225, 227, requesting information from the VRM 225, 227, requesting the VRM 225, 227 to perform operations, configuring the VRM 225, 227, etc. For example, an HMS API interface 502 of the VRM 225, 227 is to facilitate communications between the HMS 208, 214 and the VRM 225, 227, another API interface 506 of the VRM 225, 227 is to facilitate communications between the operations and management layer 406 and the VRM 225, 227, and another API interface 508 of the VRM 225, 227 is to facilitate communications between the VRM 225, 227 and the network virtualization manager 304 and a vCenter server 510. Another API interface 504 of the VRM 225, 227 may be used to facilitate communications between the VRM 225, 227 and user interfaces for use by administrators to manage the VRM 225, 227.

The example VRM 225, 227 communicates with the HMS 208, 214 via the HMS API interface 502 to manage the physical hardware resources 224, 226. For example, the VRM 225, 227 obtains and maintains inventory of the physical hardware resources 224, 226 through communications with the HMS 208, 214. The example VRM 225, 227 also uses the HMS 208, 214 to discover new hardware (e.g., the physical hardware resources 224, 226) and adds newly discovered hardware to inventory. The example VRM 225, 227 is also configured to manage the physical hardware resources 224, 226 within the virtual server rack 206 by using the per-rack HMS 208, 214. The example VRM 225, 227 maintains the notion of fault domains and uses those domains in its mapping of logical resources (e.g., virtual resources) to the physical hardware resources 224, 226. In response to notification of hardware events from the HMS 208, 214, the example VRM 225, 227 handles addition/removal of physical hardware resources 224, 226 (e.g., servers or switches at a physical rack level), addition of new rack units, maintenance, and hard shutdowns/resets. The example VRM 225, 227 also translates physical sensor data and alarms to logical events.

In the illustrated example of FIG. 5, a software stack of the VRM 225, 227 includes an example workflow services engine 514, an example resource aggregation and correlations engine 516, an example physical resource manager (PRM) 518, an example logical resource manager (LRM) 520, an example broadcasting and election manager 522, an example security manager 524, an example asset inventory and license manager 526, an example logical object generation engine 528, an example event process manager 530, an example VRM directory 532, and example extensibility tools 534. The example VRM 225, 227 also includes an example VRM data store 536. The example workflow services engine 514 is provided to manage the workflows of services provisioned to be performed by resources of the virtual server rack 206. The example resource aggregation and correlations engine 516 is provided to aggregate logical and physical resources and to coordinate operations between the logical and physical resources for allocating to services to be performed by the virtual server rack 206. The example PRM 518 is provided to provision, maintain, allocate, and manage the physical hardware resources 224, 226 for use by the virtual server rack 206 for provisioning and allocating logical resources. The example LRM 520 is provided to provision, maintain, allocate, and manage logical resources. The example broadcasting and election manager 522 is provided to broadcast or advertise capabilities of the virtual server rack 206. For example, services seeking resources of virtual server racks may obtain capabilities (e.g., logical resources) that are available from the virtual server rack 206 by receiving broadcasts or advertisements of such capabilities from the broadcasting and election manager 522. The broadcasting and election manager 522 is also configured to identify resources of the virtual server rack 206 that have been requested for allocation. The example security manager 524 is provided to implement security processes to protect from misuse of resources of the virtual server rack 206 and/or to protect from unauthorized accesses to the virtual server rack 206. The example asset inventory and license manager 526 is provided to manage inventory of components of the virtual server rack 206 and to ensure that the different components of the virtual server rack 206 are used in compliance with licensing requirements. In the illustrated example, the example asset inventory and license manager 526 also communicates with licensing servers to ensure that the virtual server rack 206 has up-to-date licenses in place for components of the virtual server rack 206. The example logical object generation engine 528 is provided to generate logical objects for different portions of the physical hardware resources 224, 226 so that the logical objects can be used to provision logical resources based on the physical hardware resources 224, 226. The example event process manager 530 is provided to manage instances of different processes running in the virtual server rack 206. The example VRM directory 532 is provided to track identities and availabilities of logical and physical resources in the virtual server rack 206. The example extensibility tools 534 are provided to facilitate extending capabilities of the virtual server rack 206 by adding additional components such as additional physical racks to form the virtual server rack 206. The example VRM data store 536 is provided to store configuration information, provisioning information, resource allocation information, and/or any other information used by the VRM 225, 227 to manage hardware configurations, logical configurations, workflows, services, etc. of the virtual server rack 206. In the illustrated example, the VRM 225, 227 may be configured by an administrator that accesses the VRM 225, 227 through an example VRM portal 540 that is a web-based interface that provides access to one or more of the components of the VRM 225, 227.

In the illustrated example, the operations and management layer 406 is in communication with the VRM 225, 227 via the API interface 506 to provide different services such as heat-map service, capacity planner service, maintenance planner service, events and operational view service, and virtual rack application workloads manager service. In the illustrated example, the network virtualization manager 304 and the vCenter server 510 are in communication with the VRM 225, 227 to instantiate, manage, and communicate with virtual networks and virtual infrastructures. For example, the network virtualization manager 304 of the illustrated example virtualizes network resources such as physical hardware switches to provide software-based virtual networks. The example vCenter server 510 provides a centralized and extensible platform for managing virtual infrastructures. For example, the vCenter server 510 provides centralized management of virtual hosts and virtual machines from a single console. The vCenter server 510 of the illustrated example communicates with the VRM 225, 227 via the API interface 508 to provide administrators with views of and access to configurations of the virtual server rack 206.

Figure 6:
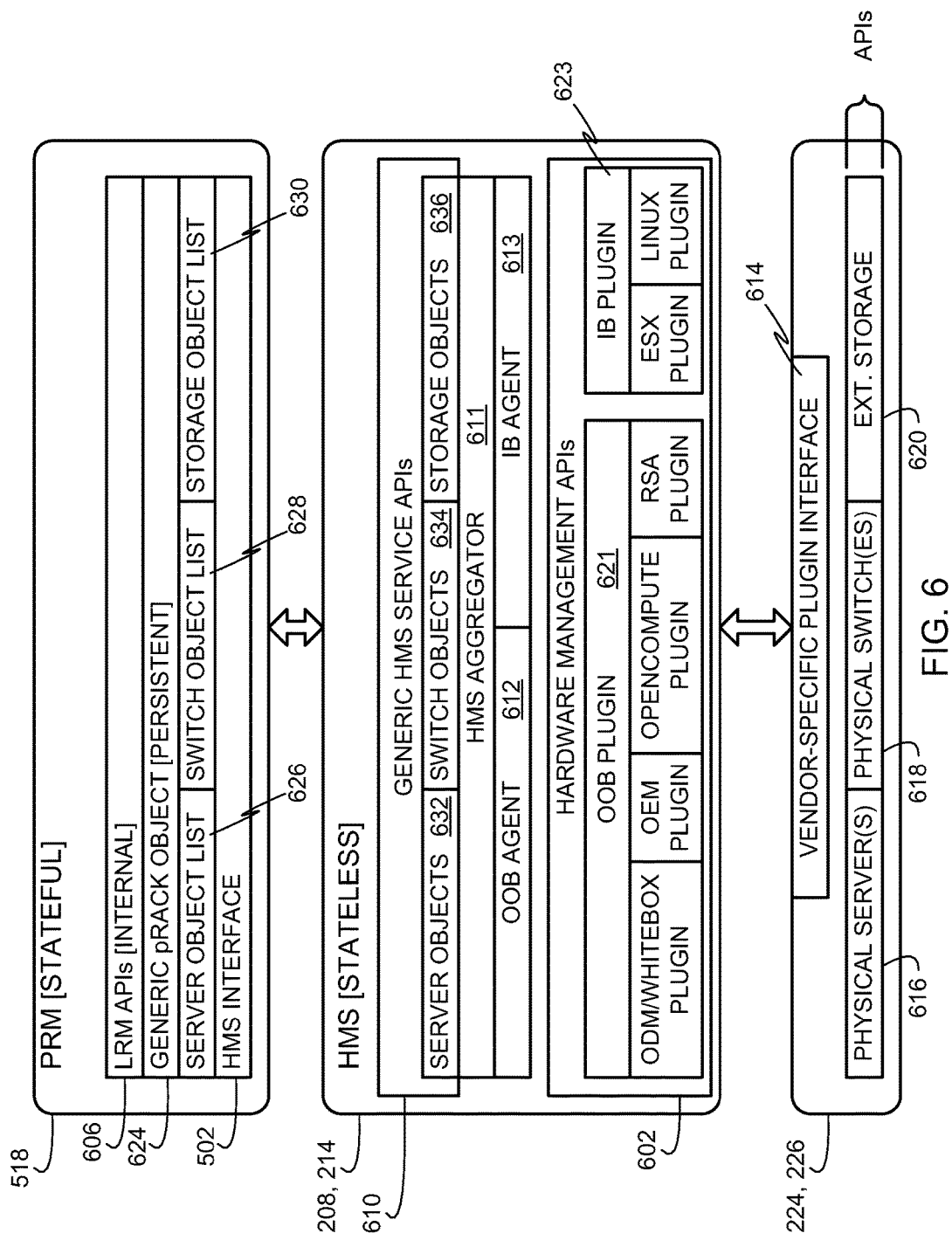
FIG. 6 depicts an example hardware management application program interface (API) of the HMS of FIGS. 2-5 that is between example hardware resources and an example physical rack resource manager (PRM).

FIG. 6 depicts example hardware management application program interfaces (APIs) 602 of the HMS 208, 214 of FIGS. 2-5 that are between the example physical hardware resources 224, 226 of FIGS. 2-5 and the example PRM 518. The example PRM 518 is a component of the VRM 225, 227 (FIGS. 4 and 5) in the software stack of the virtual server rack 206 (FIG. 2). An example PRM 518 is provided in each physical rack 202, 204 and is configured to manage corresponding physical hardware resources 224, 226 of the corresponding physical rack 202, 204 (FIG. 2) and to maintain a software physical rack object for the corresponding physical rack 202, 204. The example PRM 518 interfaces with the corresponding HMS 208, 214 of the same physical rack 202, 204 to manage individual physical hardware resources 224, 226. In some examples, the PRM 518 runs an HMS monitor thread (e.g., similar or part of the HMS monitor 422 of FIG. 4) to monitor a management switch 207, 213 that runs the HMS 208, 214 for Type 4 and Type 5 failures shown in Table 1 above. In some examples, the HMS monitor thread in the PRM 518 also monitors for some Type 3 failures shown in Table 1 above when an OS of the management switch 207, 213 needs external intervention.

In the illustrated example, the PRM 518 provides a set of LRM API's 606 for use of the physical rack object by the example LRM 520 (FIG. 5). The example LRM 520 interacts with individual PRM 518 instances to employ physical resources based on physical resource requirements of the LRM 520. In some examples, the PRM 518 runs as part of an LRM application on a given server node in a virtual server rack 206. In the illustrated example, the LRM 520 is implemented using Java on Linux. However, any other programming language and any other operating system may be used. The PRM 518 of the illustrated example runs in an x86-based Linux Virtual Machine environment as part of the VRM 225, 227 on a designated server node in the physical rack 202, 204.

In the illustrated example of FIG. 6, the HMS 208, 214 publishes a set of generic HMS service APIs 610 for use by original equipment manufacturers (OEMs) to integrate hardware or software with the software stack of the virtual server rack 206. In the illustrated example, the integration point for OEM components is the hardware management APIs 602. In the illustrated example, vendor-specific plugin interfaces 614 may be developed for use by the hardware management API 602 to facilitate communications with physical hardware resources 224, 226 of particular vendors having vendor-specific interfaces. In the illustrated example, such vendor-specific plugin interfaces 614 interface to corresponding physical hardware resources 224, 226 using interface protocols supported by the underlying hardware components (e.g., an IPMI API, a representational state transfer (REST) API, an extensible markup language (XML) API, a hypertext transfer protocol (HTTP) API, a customer information model (CIM) API, etc.). In the illustrated example, the physical hardware resources 224, 226 are shown as one or more physical server(s) 616, one or more physical switch(es) 618, and external storage 620. The physical switches 618 of the illustrated example include the management switch 207, 213 and the ToR switches 210, 212, 216, 218 of FIG. 2.

In the illustrated example, the HMS 208, 214 provides the set of example generic HMS service APIs 610 for use by the PRM 518 to access use of virtual resources based on the physical hardware resources 224, 226. In the illustrated example, the generic HMS service APIs 610 are not specific to any particular vendor and/or hardware and are implemented using a REST/JSON (JavaScript object notation) API protocol. However, any other API protocol may be used. The example generic HMS service APIs 610 act on the underlying physical hardware resources 224, 226, which are encapsulated in a set of software objects such as server objects 632, switch objects 634, and storage objects 636. In the illustrated example, the HMS 208, 214 maintains the server objects 632, the switch objects 634, and the storage objects 636, and their associated properties. In the illustrated example, the HMS 208, 214 runs the generic HMS service APIs 610 on the example server host node(0) 209, 211 (FIG. 2) to interface with the example PRM 518 and to an example HMS aggregator 611. The example HMS aggregator 611 runs on the example server host node(0) 209, 211 to aggregate data from an example OOB agent 612 and an example IB agent 613 to expose such data to the PRM 518 and, thus, the VRM 225, 227 (FIGS. 2, 4, and 5). In addition, the HMS aggregator 611 obtains data from the PRM 518 and parses the data out to corresponding ones of the OOB agent 612 for communicating to the physical hardware resources 224, 226, and to the IB agent 613 for communicating to software components. In the illustrated example, the OOB agent 612 runs on the management switch 207, 213, and the IB agent 613 runs on the server host node(0) 209, 211. The example OOB agent 612 interfaces with the physical resources 224, 226 and interfaces with the HMS aggregator 611. The example IB agent 613 interfaces with operating systems and interfaces with the HMS aggregator 611. That is, in the illustrated example, the OOB agent 612 is configured to communicate with vendor hardware via vendor-specific interfaces. The example IB agent 613 is configured to communicate with OS-specific plugins and does not communicate directly with hardware. Instead, the IB agent 613 communicates with operating systems to obtain information from hardware when such information cannot be obtained by the OOB agent 612. For example, the OOB agent 612 may not be able to obtain all types of hardware information (e.g., hard disk drive or solid state drive firmware version). In such examples, the IB agent 613 can request such hardware information from operating systems.

In examples disclosed herein, server and switch plugin APIs are to be implemented by vendor-supplied plugins for vendor-specific hardware. For example, such server and switch plugin APIs are implemented using OOB interfaces according to an HMS specification. For vendor-specific plugin interfaces 614 that do not support OOB communication based on the vendor-supplied plugin, the HMS 208, 214 implements an IB plugin 623 to communicate with the vendor's hardware via an operating system plugin using IB communications. For example, the IB plugin 623 in the HMS 208, 214 interfaces to the operating system running on the server node (e.g., the server node implemented by the vendor's hardware) using an OS-provided mechanism such as OS APIs (e.g., vSphere APIs), OS command line interfaces (CLI) (e.g., ESX CLI), and/or Distributed Management Task Force (DMTF) Common Information Model (CIM) providers.

The example HMS 208, 214 internally maintains the hardware management API 602 to service API requests received at the generic HMS service APIs 610. The hardware management API 602 of the illustrated example is vendor-specific and is implemented as a vendor-specific plugin to the HMS 208, 214. The hardware management API 602 includes example OOB plugins 621 to interface with vendor-specific plugin interfaces 614 to communicate with the actual physical hardware resources 224, 226. For example, the OOB plugin 621 interfaces with the example OOB agent 612 to exchange data between the generic HMS service APIs 610 and the vendor-specific plugin interface 614. Example vendor-specific interfaces 614 may be proprietary to corresponding OEM vendors for hardware management. Regardless of whether the vendor-specific interfaces 614 are proprietary, or part of an industry standard or open interface, the published hardware management API 602 is configured to work seamlessly between the PRM 518 and the physical hardware resources 224, 226 to manage the physical hardware resources 224, 226. To communicate with the physical hardware resources 224, 226 via operating systems, the hardware management API 602 is provided with an example IB plugin 623. That is, in the illustrated example, the IB plugin 623 operates as an OS plugin for the IB agent 613 to communicate with operating systems.

In the illustrated examples, the HMS 208, 214 uses the example OOB agent 612 and the example OOB plugin 621 for OOB management of the physical hardware resources 224, 226, and uses the example IB agent 613 and the example IB plugin 623 for IB management of the physical hardware resources 224, 226. In examples disclosed herein, OOB components such as the OOB agent 612 and the OOB plugin 621 run in the management switch 207, 213, and IB components such as the IB agent 613, the IB plugin 623, the generic HMS service APIs 610, and the HMS aggregator run 611 in the server host node(0) 209, 211. Such separation of IB management and OOB management components of the HMS 208, 214 facilitates increased resiliency of HMS 208, 214 in case of failure of either of the IB management channel or the OOB management channel. Such IB and OOB management separation also simplifies the network configuration of the ToR switches 210, 212, 216, 218 (FIGS. 2 and 3) and keeps the management network isolated for security purposes. In examples disclosed herein, a single generic API interface (e.g., a REST API, a JSON API, etc.) implementing the example generic HMS service APIs 610 is provided between the PRM 518 and the HMS 208, 214 to facilitate hiding all hardware and vendor specificities of hardware management in the HMS 208, 214 and isolating the complexity of such hardware and vendor specificities from upper layer processes in the PRM 518 and/or a LRM 520.

In examples disclosed herein, the HMS 208, 214 uses an IPMI/DCMI (Data Center Manageability Interface) for OOB management. Example OOB operations performed by the HMS 208, 214 include discovery of new hardware, bootstrapping, remote power control, authentication, hard resetting of non-responsive hosts, monitoring catastrophic hardware failures, and firmware upgrades. In examples disclosed herein, an Integrated BMC (baseboard management controller) Embedded local area network (LAN) channel is used for OOB management of server hosts 616. In examples disclosed herein, one dedicated interface is enabled for OOB management traffic. In such examples, the interface is enabled for dynamic host configuration protocol (DHCP) and connected to a management switch (e.g., the management switch 207, 213 running the HMS 208, 214). In examples disclosed herein, an administrative user is created to operate the dedicated interface for OOB management traffic. An example HMS OOB thread uses IPMI commands to discover and manage server nodes 616 over the dedicated interface for OOB management traffic. Example IPMI features that may be used over the Integrated BMC Embedded LAN for OOB management traffic include the following properties and sensors.

Properties
Device ID
Cold Reset
Get Self Test Results
Set/Get ACPI Power State
Set/Get User Name
Set/Get User Access
Set/Get User Password
Get Chassis Status
Chassis Control Power Down/Up/Power Cycle/Hard Reset
Chassis Identity
Set/Get System Boot Options
Get System Restart Cause
Set/Get LAN configuration
DHCP Host Name
Authentication Type Support
Authentication Type Enable
Primary RMCP Port Number
Default Gateway
Sensors
Power Unit Status
BMC Firmware Health
HDD status
Processor Status
Processor DIMM
Processor Temperature The example HMS 208, 214 uses IB management to periodically monitor status and health of the physical resources 224, 226 and to keep server objects 632 and switch objects 634 up to date. In examples disclosed herein, the HMS 208, 214 uses Distributed Management Task Force (DMTF) Common Information Model (CIM) providers in a VMware ESXi™ hypervisor and CIM client for IB management. The CIM is the software framework used for managing hardware devices and services defined by the DMTF and supported in the VMware ESXi™ hypervisor. CIM providers are classes that receive and fulfill client requests dispatched to them by a CIM object manager (CIMOM). For example, when an application requests dynamic data from the CIMOM, it uses the CIM provider interfaces to pass the request to the CIM provider. Example IB operations performed by the HMS 208, 214 include controlling power state, accessing temperature sensors, controlling BIOS (Basic Input/Output System) inventory of hardware (e.g., CPUs, memory, disks, etc.), event monitoring, and logging events. In examples disclosed herein, the main components which the HMS 208, 214 monitors using IB management are I/O devices (e.g., Network Interface Cards, PCI-e interfaces, and Disk Drives). In examples disclosed herein, the HMS 208, 214 uses CIM providers to monitor such I/O devices. Example CIM providers may be developed as VMware ESXi™ hypervisor userworlds to interface with drivers corresponding to I/O devices being monitored to gather data pertaining to those I/O devices. In some examples, the CIM providers are C++ classes, which define sets of objects and corresponding properties for use by the HMS 208, 214 to fetch data from the underlying physical resources 224, 226 (e.g., hardware I/O devices).

The PRM 518 of the illustrated example exposes a physical rack object and its associated sub-objects in a generic vendor neutral manner to the example LRM 520. Example sub-objects of the physical rack object include an example server object list 626 (e.g., a list of servers), an example switch object list 628 (e.g., a list of switches), and a storage object list 630 (e.g., a list of external storage). The example PRM 518 communicates with the example HMS 208, 214 using the example generic HMS service APIs 610 to manage physical resources (e.g., hardware) in the physical rack 202, 204, and to obtain information and inventory of physical resources available in the physical rack 202, 204. In the illustrated example, the HMS 208, 214 executes instructions from the PRM 518 that are specific to underlying physical resources based on the hardware management APIs 602 of those physical resources. That is, after the HMS 208, 214 receives an instruction via a generic HMS service APIs 610 from the PRM 518 that corresponds to an action on a particular physical resource in the physical rack 202, 204, the HMS 208, 214 uses the example hardware management APIs 602 to issue a corresponding instruction to the particular physical resource using a hardware management API of that particular physical resource. In this manner, the PRM 518 need not be configured to communicate with numerous different APIs of different physical resources in the physical rack 202, 204. Instead, the PRM 518 is configured to communicate with the HMS 208, 214 via the generic HMS service APIs 610, and the HMS 208, 214 handles communicating with numerous different, specific APIs of different physical resources through the example hardware management API 602. By using the generic HMS service APIs 610 for the PRM 518 to interface with and manage physical resources through the HMS 208, 214, the physical racks 202, 204 may be configured or populated with hardware from numerous different manufacturers without needing to significantly reconfigure the PRM 518. That is, even if such manufacturers require use of different APIs specific to their equipment, the HMS 208, 214 is configured to handle communications using such different APIs without changing how the PRM 518 uses the generic HMS service APIs 610 to communicate with the physical resources via the HMS 208, 214. Thus, the separation of the example generic HMS service APIs 610 from the example hardware management API 602 allows the HMS 208, 214 to integrate seamlessly with hardware from ODMs, OEMs, and other vendors independently of the generic HMS service APIs 610 provided by the HMS 208, 214 for use by the PRM 518 to manage such hardware.

The generic HMS service APIs 610 of the illustrated example supports numerous Get/Set events so that the HMS 208, 214 can support requests from the PRM 518. Such Get/Set events will work on software server and switch object properties. Example Get/Set events of the generic HMS service APIs 610 include:

PRM_HMS_ACK_HANDSHAKE ( )
PRM_HMS_GET_RACK_INVENTORY (Server Obj[ ], Switch Obj[ ], . . . )
PRM_HMS_GET_SERVER_OBJECT_PROP (Key, Value)
PRM_HMS_SET_SERVER_OBJECT_PROP (Key, Value)
PRM_HMS_GET_SWITCH_OBJECT_PROP (Key, Value)
PRM_HMS_SET_SWITCH_OBJECT_PROP (Key, Value)

In the above example Get/Set events of the generic HMS service APIs 610, the 'Key' is the property ID listed as part of the server/switch object properties. The example PRM_HMS_ACK_HANDSHAKE ( ) event API enables the PRM 518 to perform an acknowledgment-based handshake with the HMS 208, 214 to establish a connection between the PRM 518 and the HMS 208, 214. The example PRM_HMS_GET_RACK_INVENTORY (Server Obj[ ], Switch Obj[ ], . . . ) API enables the PRM 518 to request the HMS 208, 214 to provide the hardware inventory of the physical rack 202, 204. The example PRM_HMS_GET_SERVER_OBJECT_PROP (Key, Value) API enables the PRM 518 to request a server object property from the HMS 208, 214. For example, the PRM 518 provides the 'Key' identifying the requested server object property ID, and the HMS 208, 214 returns the 'Value' of the requested server object property. The example PRM_HMS_SET_SERVER_OBJECT_PROP (Key, Value) API enables the PRM 518 to set a server object property via the HMS 208, 214. For example, the PRM 518 provides the 'Key' identifying the target server object property ID, and provides the 'Value' to set for the target server object property. The example PRM_HMS_GET_SWITCH_OBJECT_PROP (Key, Value) API enables the PRM 518 to request a switch object property from the HMS 208, 214. For example, the PRM 518 provides the 'Key' identifying the requested switch object property ID, and the HMS 208, 214 returns the 'Value' of the requested switch object property. The example PRM_HMS_SET_SWITCH_OBJECT_PROP (Key, Value) API enables the PRM 518 to set a switch object property via the HMS 208, 214. For example, the PRM 518 provides the 'Key' identifying the target switch object property ID, and provides the 'Value' to set for the target switch object property.

The PRM 518 of the illustrated example registers a set of callbacks with the HMS 208, 214 that the PRM 518 is configured to use to receive communications from the HMS 208, 214. When the PRM callbacks are registered, the HMS 208, 214 invokes the callbacks when events corresponding to those callbacks occur. Example PRM callback APIs that may be registered by the PRM 518 as part of the generic HMS service APIs 610 include:

PRM Callback APIs
HMS_PRM_HOST_FAILURE (Server Obj[ ], REASON CODE)
HMS_PRM_SWITCH_FAILURE (Switch Obj[ ], REASON CODE)
HMS_PRM_MONITOR_SERVER_OBJECT (Key, Value, Update Frequency)
HMS_PRM_MONITOR_SWITCH_OBJECT (Key, Value, Update Frequency)

The example HMS_PRM_HOST_FAILURE (Server Obj[ ], REASON CODE) callback enables the HMS 208, 214 to notify the PRM 518 of a failure of a host (e.g., a physical server) in the physical rack 202, 204. The example HMS_PRM_SWITCH_FAILURE (Switch Obj[ ], REASON CODE) callback enables the HMS 208, 214 to notify the PRM 518 of a failure of a switch of the physical rack 202, 204. The example HMS_PRM_MONITOR_SERVER_OBJECT (Key, Value, Update Frequency) callback enables the HMS 208, 214 to send monitor updates to the PRM 518 about a server object. In the illustrated example, 'Key' identifies the server object to which the update corresponds, 'Value' includes the updated information monitored by the HMS 208, 214 for the server object, and 'Update Frequency' indicates the frequency with which the server object monitor update callbacks are provided by the HMS 208, 214 to the PRM 518. The example HMS_PRM_MONITOR_SWITCH_OBJECT (Key, Value, Update Frequency) callback enables the HMS 208, 214 to send monitor updates to the PRM 518 about a switch object. In the illustrated example, 'Key' identifies the switch object to which the update corresponds, 'Value' includes the updated information monitored by the HMS 208, 214 for the switch object, and 'Update Frequency' indicates the frequency with which the switch object monitor update callbacks are provided by the HMS 208, 214 to the PRM 518.

The example generic HMS service APIs 610 provide non-maskable event types for use by the HMS 208, 214 to notify the PRM 518 of failure scenarios in which the HMS 208, 214 cannot continue to function.

Non-Maskable Event HMS APIs
HMS_SOFTWARE_FAILURE (REASON CODE)
HMS_OUT_OF_RESOURCES (REASON CODE)

The example HMS_SOFTWARE_FAILURE (REASON CODE) non-maskable event API enables the HMS 208, 214 to notify the PRM 518 of a software failure in the HMS 208, 214. The example HMS_OUT_OF_RESOURCES (REASON CODE) non-maskable event API enables the HMS 208, 214 to notify the PRM 518 when the HMS 208, 214 is out of physical resources.

The HMS 208, 214 provides the example hardware management APIs 602 for use by the example generic HMS service APIs 610 so that the HMS 208, 214 can communicate with the physical resources 224, 226 based on instructions received from the PRM 518 via the generic HMS service APIs 610. The hardware management APIs 602 of the illustrated example interface with physical resource objects using their corresponding management interfaces, some of which may be vendor-specific interfaces. For example, the HMS 208, 214 uses the hardware management APIs 602 to maintain managed server, switch, and storage software object properties. Example hardware management APIs 602 for accessing server objects are shown below in Table 2.

TABLE 2

Server Hardware Management APIs

| API | Return Value | Description |
| --- | --- | --- |
| DISCOVER_SERVER_INVENTORY( ) A Node Object identifies a server hardware node (Node ID, MAC Address, Management IP Address) | Node object list | Used to discover all servers in a rack. Homogeneous hardware assumption Board information required for hardware |

TABLE 2-continued

Server Hardware Management APIs

| API | Return Value | Description |
|---|---|---|
| | | identification to attach to the right plugin. |
| GET_CHASSIS_SERIAL_NUMBER (NODE_OBJECT) | Chassis serial number | Used to get chassis identifier |
| GET_BOARD_SERIAL_NUMBER (NODE_OBJECT) | Board serial number | Used to get board identifier |
| GET_MANAGEMENT_MAC_ADDR (NODE_OBJECT) | MAC address | Used to get MAC address of management port |
| SET_MANAGEMENT_IP_ADDR(NODE_OBJECT, IPADDR) | RC (Success/Error Code) | Used to set management IP address |
| GET_CPU_POWER_STATE(NODE_OBJECT) | CPU powerstate | Used to get current power state [S0-S5] of CPU |
| SET_CPU_POWER_STATE(NODE_OBJECT, POWERSTATE) | RC | Used to set CPU power state |
| SET_SERVER_POWER_STATE (ON/OFF/CYCLE/RESET) | RC | Used to power on, power off, power cycle, reset a server Cold reset-BMC reset, run Self Test Warm Reset-No Self Test |
| GET_SERVER_CPU_PROPERTIES (NODE_OBJECT, CPU_OBJECT) | RC | Used to get CPU specific information |
| SET_SERVER_CPU_PROPERTIES (NODE_OBJECT, CPU_OBJECT) | RC | Used to set CPU properties |
| GET_SERVER_MEMORY_PROPERTIES (NODE_OBJECT, MEM_OBJECT) | RC | Used to get memory properties |
| GET_SERVER_NETWORKCONTROLLER_PROPERTIES (NODE_OBJECT, NETWORKCONTROLLER_OBJECT[]) | RC | Used to get Network controller properties including LOM, NICS |
| SET_SERVER_NETWORKCONTROLLER_PROPERTIES (NODE_OBJECT, NET_WORKCONTROLLER_OBJECT[]) | RC | Used to set NIC properties |
| GET_SERVER_DISK_PROPERTIES(NODE_OBJECT, DISK_OBJECT[]) | RC | Used to get Disk properties |
| SET_SERVER_DISK_PROPERTIES (NODE_OBJECT, DISK_OBJECT[]) | RC | Used to set Disk properties |
| GET_SERVER_DISK_SMART_DATA (NODE_OBJECT, SMART_OBJECT) | RC | Used to get SMART data for disk |
| SET_SERVER_SENSOR (NODE_OBJECT, SENSOR, VALUE, THRESHOLD) | RC | Used to set sensors for CPU/Memory/Power/HDD |
| GET_SENSOR_STATUS (NODE_OBJECT, SENSOR, VALUE, UNITS, THRESHOLD) | RC | Used to get sensor data |
| GET_SYSTEM_EVENT_LOG_DATA(. . .) | | Used to get System event log data |
| UPDATE_CPU_FIRMWARE(FILE . . . ) | | Update CPU firmware |
| UPDATE_DISK_FIRMWARE(FILE. . . ) | | Update Disk Firmware |
| UPDATE_NIC_FIRMWARE(FILE. . . . . . ) | | Update NIC firmware |
| SET_CHASSIS_IDENTIFICATION (NODE_OBJECT, ON/OFF, NUMSECS) | | LED/LCD/BEEP |
| SET_BOOTOPTION (NODE_OBJECT, TYPE) | RC | Used to set bootoption SSD/PXE |
| GET_BOOTOPTION (NODE_OBJECT) | BOOT TYPE | Used to get bootoption |
| SET_CREATE_USER (NODE_OBJECT, USEROBJECT) | RC | Used to create a management user |

Example hardware management APIs 602 for accessing switch objects are shown below in Table 3.

TABLE 3

Switch Hardware Management APIs

| API | Return Value | Description |
|---|---|---|
| GET_CHASSIS_SERIAL_ID (NODE_OBJECT) | CHASSIS_IDENTIFIER | Used to identify a ToR Switch chassis |
| GET_MANAGEMENT_MAC (NODE_OBJECT) | MAC_ADDRESS | API to get Management port MAC address |
| SET_MANAGEMENT_IP(NODE_OBJECT IP ADDR) | RC | API to set management IP address |
| GET_SWITCH_INVENTORY (NODE_OBJECT) | SWITCH_INVENTORY | Used to get switch hardware inventory (HW, Power supply, Fans, Transceiver etc.) |
| SWITCH_REBOOT (NODE_OBJECT) | RC | Used to reboot the switch |
| CREATE_SWITCH_USER (NODE_OBJECT, USER_OBJECT) | RC | Used to create a management user |
| GET_SWITCH_VERSION (NODE_OBJECT) | VERSION_OBJECT | Used to get Hardware and software version details |

TABLE 3-continued

Switch Hardware Management APIs

| API | Return Value | Description |
|---|---|---|
| GET_SWITCH_HW_PLATFORM (NODE_OBJECT) | HARDWARE_CHIPSET_OBJECT | Used to get the switching ASIC information |
| APPLY_SWITCH_CONFIGURATION (NODE_OBJECT, CONFIG_FILE) | CONFIG_STATUS_OBJECT | Used to apply running configuration on a switch |
| DELETE_SWITCH_CONFIGURATION (NODE_OBJECT) | RC | Used to delete startup switch configuration |
| SET_LOG_LEVELS (NODE_OBJECT, LOG_LEVEL) | RC | Used to set log levels for alert, events and debug from the switch |
| GET_SWITCH_ENVIRONMENT (NODE_OBJECT, POWER_OBJ, COOLING_OBJ, TEMPERATURE_OBJ) | RC | Used to get environmental information from the switch for power, fans and temperature. |
| SET_LOCATOR_LED (NODE_OBJECT) | RC | Used to set locator LED of switch |
| GET_INTERFACE_COUNTERS (NODE_OBJECT, INT_OBJECT) | RC | Used to collect interface statistics |
| GET_INTERFACE_ERRORS (NODE_OBJECT, INT_OBJECT) | RC | Used to collect errors on switch interfaces |
| GET_INTERFACE_STATUS(NODE_OBJECT, INT_OBJECT) | RC | Used to get interface status |
| SET_INTERFACE_STAUS(NODE_OBJECT, INT_OBJECT) | RC | Used to set interface status |
| GET_INTERFACE_PHY_STATUS (NODE_OBJECT, INT_OBJECT) | RC | Used to get physical status of interface |
| GET_INTERFACE_SPEED (NODE_OBJECT, INT_OBJECT") | RC | Used to get the speed/auto negotiation mode |
| GET_VLAN_SUMMARY (NODE_OBJECT, VLAN_OBJECT) | RC | Get VLAN information Number of VLAN in use and ports connected to. |
| GET_VLAN_COUNTERS (NODE_OBJECT, VLAN_OBJECT) | RC | Get VLAN specific counters |
| GET_VXLAN_TABLE(NODE_OBJECT, VXLAN_TABLE) | RC | VXLAN address table |
| GET_VXLAN_COUNTERS(NODE_OBJECT, VXLAN_OBJECT) | RC | VXLAN specific counters |
| CLEAR_VLAN_COUNTERS | RC | Clear VLAN counters |
| CLEAR_VXLAN_COUNTERS | RC | Clear VXLAN counters |
| MONITOR_LINK_FLAPS(NODE_OBJECT, INT_OBJECT) L3/MLAG/LAG STATUS | RC | Monitor link flaps |
| SET_PORT_MTU (NODE_OBJECT, MTU) | RC | Set Port MTU |
| SWITCH_OS_UPGRADE(FILE *) | RC | Ability to upgrade the OS on the switch |

In the illustrated example of FIG. 6, the PRM 518 maintains an example generic pRack object 624. The example generic pRack object 624 persists a list of the physical resources 224, 226 returned by the HMS 208, 214 and classified according to object types. The example generic pRack object 624 includes the following pRack object definition.

pRACK Object
Rack ID (Logical Provided by VRM 225, 227)
Manufacturer ID ( )
Number Server Objects
Server Object List 626
Switch Object List 628
HMS heartbeat timestamp In the pRack object definition above, the Rack ID is the logical identifier of the virtual server rack 206 (FIG. 2). The Manufacturer ID ( ) returns the identifier of the system integrator 104 (FIG. 1) that configured the virtual server rack 206. The 'Number Server Objects' element stores the number of server objects configured for the virtual server rack 206. The 'Server Object List' 626 element stores a listing of server objects configured for the virtual server rack 206. The 'Switch Object List' 628 element stores a listing of switch objects configured for the virtual server rack 206. The 'HMS heartbeat timestamp' element stores timestamps of when the operational status (e.g., heartbeat) of the virtual server rack 206 is checked during periodic monitoring of the virtual server rack 206.

The example PRM 518 provides the LRM APIs 606 for use by the LRM 520 (FIG. 5) to access the elements above of the pRack object 624. In examples disclosed herein, the PRM 518 and the LRM 520 run in the same application. As such, the PRM 518 and the LRM 520 communicate with each other using local inter-process communication (IPC). Examples of Get/Set event APIs of the LRM APIs 606 include:

Get/Set Event LRM APIs
LRM_PRM_RECIEVE_HANDSHAKE_ACK ( )
LRM_PRM_GET_RACK_OBJECT (PRM_RACK_OBJECT [ ])
LRM_PRM_SET_SERVER_OBJECT_PROP (Key, Value)
LRM_PRM_GET_SERVER_STATS (Available, InUse, Faults)
LRM_PRM_SET_SERVER_CONFIG (SERVER_CONFIG_BUFFER)
LRM_PRM_SET_SWITCH_ADV_CONFIG (SWITCH_CONFIG_BUFFER)

In the Get/Set Event LRM APIs, the example LRM_PRM_RECIEVE_HANDSHAKE_ACK ( ) API may be used by the LRM 520 to establish a connection between the LRM 520 and the PRM 518. The example LRM_PRM_GET_RACK_OBJECT (PRM_RACK_OBJECT [ ]) API may be used by the LRM 520 to obtain an identifier of the rack object corresponding to the virtual server rack 206. The example LRM_PRM_SET_SERVER_OBJECT_PROP (Key, Value) API may be used by the LRM 520 to set a server object property via the PRM 518. For example, the LRM 520 provides the 'Key' identifying the target server object property ID, and provides the 'Value' to set for the target server object property. The example LRM_PRM_GET_SERVER_STATS (Available, InUse, Faults) API may be used by the LRM 520 to request via the PRM 518 operational status of servers of the physical resources 224, 226. For example, the PRM 518 may return an 'Available' value indicative of how many servers in the physical resources 224, 226 are available, may return an 'InUse' value indicative of how many servers in the physical resources 224, 226 are in use, and may return a 'Faults' value indicative of how many servers in the physical resources 224, 226 are in a fault condition. The example LRM_PRM_SET_SERVER_CONFIG (SERVER_CONFIG_BUFFER) API may be used by the LRM 520 to set configuration information in servers of the physical resources 224, 226. For example, the LRM 520 can pass a memory buffer region by reference in the 'SERVER_CONFIG_BUFFER' parameter to indicate a portion of memory that stores configuration information for a server. The example LRM_PRM_SET_SWITCH_ADV_CONFIG (SWITCH_CONFIG_BUFFER) may be used by the LRM 520 to set configuration information in switches of the physical resources 224, 226. For example, the LRM 520 can pass a memory buffer region by reference in the 'SWITCH_CONFIG_BUFFER' parameter to indicate a portion of memory that stores configuration information for a switch.

The LRM 520 of the illustrated example registers a set of callbacks with the PRM 518 that the LRM 520 is configured to use to receive communications from the PRM 518. When the LRM callbacks are registered, the PRM 518 invokes the callbacks when events corresponding to those callbacks occur. Example callbacks that may be registered by the LRM 520 include:

LRM Callback APIs
PRM_LRM_SERVER_DOWN (SERVER_ID, REASON_CODE)
PRM_LRM_SWITCH_PORT_DOWN (SERVER_ID, REASON_CODE)
PRM_LRM_SERVER_HARDWARE_FAULT (SERVER_ID, REASON_CODE)

The example PRM_LRM_SERVER_DOWN (SERVER_ID, REASON_CODE) callback API enables the PRM 518 to notify the LRM 520 when a server is down. The example PRM_LRM_SWITCH_PORT_DOWN (SERVER_ID, REASON_CODE) callback API enables the PRM 518 to notify the LRM 520 when a switch port is down. The example PRM_LRM_SERVER_HARDWARE_FAULT (SERVER_ID, REASON_CODE) callback API enables the PRM 518 to notify the PRM 518 to notify the LRM 520 when a server hardware fault has occurred.

The example generic HMS service APIs 610 provide non-maskable event types for use by the HMS 208, 214 to notify the PRM 518 of failure scenarios in which the HMS 208, 214 cannot continue to function.

Non-Maskable Event LRM APIs
PRM_SOFTWARE_FAILURE (REASON_CODE)
PRM_OUT_OF_RESOURCES (REASON_CODE)

The example PRM_SOFTWARE_FAILURE (REASON_CODE) non-maskable event API enables the PRM 518 to notify the LRM 520 when a software failure has occurred. The example PRM_OUT_OF_RESOURCES (REASON_CODE) non-maskable event API enables the PRM 518 to notify the LRM 520 when the PRM 518 is out of resources.

An example boot process of the virtual server rack 206 (FIGS. 2 and 4) includes an HMS bootup sequence, a PRM bootup sequence, and an HMS-PRM initial handshake. In an example HMS bootup sequence, when the management switch 207, 213 on which the HMS 208, 214 runs is powered-on and the OS of the management switch 207, 213 is up and running, a bootstrap script to initialize the HMS 208, 214 is executed to fetch and install an HMS agent software installer on the management switch 207, 213 to instantiate the HMS 208, 214. The HMS agent software installer completes install and initialization of the HMS agent software bundle and starts the HMS agent daemon to instantiate the HMS 208, 214. When the HMS agent daemon is started, the HMS 208, 214 determines the inventory of the physical resources 224, 226 of the physical rack 202, 204. It does this by using an IPMI discover API which sends broadcast remote management control protocol (RMCP) pings to discover IPMI-capable nodes (e.g., nodes of the physical resources 224, 226) on a known internal subnet. In such examples, management IP addresses for server nodes (e.g., server nodes of the physical resources 224, 226) and ToR switches (e.g., ToR switches 210, 212, 216, 218) will be known apriori and published for the HMS 208, 214 to discover as internal DHCP address ranges. For example, the server hosts and the ToR switches 210, 212, 216, 218 may be assigned IP addresses using a DHCP server running on the same management switch 207, 213 that runs the HMS 208, 214.

In an example PRM bootup sequence, the PRM 518 boots up as part of the VRM 225, 227. The example VRM 225, 227 initiates the PRM 518 process. During bootup, the example PRM 518 creates an empty physical rack object and waits for the HMS 208, 214 to initiate an HMS-PRM initial handshake. When the HMS-PRM initial handshake is successful, the example PRM 518 queries the HMS 208, 214 for the physical inventory (e.g., the inventory of the physical resources 224, 226) in the physical rack 202, 204. The PRM 518 then populates the physical rack object based on the physical inventory response from the HMS 208, 214. After the HMS-PRM initial handshake with the HMS 208, 214 and after the physical rack object initialization is complete, the example PRM 518 sends a message to the LRM 520 to indicate that the PRM 518 is ready for accepting requests. However, if initialization does not succeed after a certain time period, the example PRM 518 notifies the LRM 520 that the pRack initialization has failed.

In examples disclosed herein, the HMS 208, 214 initiates the HMS-PRM initial handshake during the PRM bootup sequence to establish a connection with the PRM 518. In examples disclosed herein, when the VM hosting the VRM 225, 227 is up and running the VM creates a virtual NIC for the internal network of the virtual server rack 206 and assigns an IP address to that virtual NIC of the internal network. The ToR switch 210, 212, 216, 218 discovers how to reach and communicate with internal network of the VRM 225, 227 when the VM hosting the VRM 225, 227 powers on. In examples disclosed herein, a management port of the management switch 207, 213 is connected to the ToR switches 210, 212, 216, 218. The management port is used to manage the ToR switches 210, 212, 216, 218. In addition, the management switch 207, 213 is connected to the ToR switches 210, 212, 216, 218 over data ports and communicate using an internal VLAN network. The example VRM 225, 227 and the HMS 208, 214 can then communicate based on a predefined IP address/port number combination. For example, the HMS 208, 214 initiates the HMS-PRM initial handshake by sending a message to the predefined IP address/port number combination of the PRM 518, and the PRM 518 responds with an acknowledge (ACK) to the message from the HMS 208, 214 to complete the HMS-PRM initial handshake.

After the HMS bootup sequence, the HMS 208, 214 performs an initial discovery process in which the HMS 208, 214 identifies servers, switches, and/or any other hardware in the physical resources 224, 226 in the physical rack 202, 204. The HMS 208, 214 also identifies hardware configurations and topology of the physical resources in the physical rack 202, 204. To discover servers in the physical resources 224, 226, the example HMS 208, 214 uses IPMI-over-LAN, which uses the RMCP/RMCP+ 'Remote Management Control Protocol' defined by DMTF. In examples disclosed herein, RMCP uses port 623 as the primary RMCP port and 664 as a secure auxiliary port, which uses encrypted packets for secure communications. The example HMS 208, 214 uses an RMCP broadcast request on a known subnet to discover IPMI LAN nodes. In addition, the HMS 208, 214 uses the RMCP presence ping message to determine IPMI capable interfaces in the physical rack 202, 204. In this manner, by IPMI LAN nodes and IPMI capable interfaces, the HMS 208, 214 discovers servers present in the physical resources 224, 226.

To discover switches in the physical resources 224, 226, a DHCP server running on the management switch 207, 213 assigns management IP addresses to the ToR switches 210, 212, 216, 218. In this manner, the HMS 208, 214 can detect the presence of the ToR switches 210, 212, 216, 218 in the physical rack 202, 204 based on the management IP addresses assigned by the DHCP server.

To maintain topology information of the management network in the virtual server rack 206, a link layer discovery protocol (LLDP) is enabled on management ports of the discovered server nodes and ToR switches 210, 212, 216, 218. The example management switch 207, 213 monitors the LLDP packet data units (PDUs) received from all of the discovered server nodes and keeps track of topology information. The example HMS 208, 214 uses the topology information to monitor for new servers that are provisioned in the physical resources 224, 226 and for de-provisioning of servers from the physical resources 224, 226. The example HMS 208, 214 also uses the topology information to monitor server hosts of the physical resources 224, 226 for misconfigurations.

The example HMS 208, 214 is capable of power-cycling individual IPMI-capable server hosts in the physical resources 224, 226 of the physical rack 202, 204. For example, the HMS 208, 214 sends SYS POWER OFF and SYS POWER ON messages to the BMCs on boards of target server hosts via LAN controllers of target server hosts. The LAN controllers for the management ports of server hosts are powered on using stand-by power and remain operative when the virtual server rack 206 is powered down. In some examples, the LAN controller is embedded to the system. In other examples, the LAN controller is an add-in PCI card connected to the BMC via a PCI management bus connection.

To hard reset a switch (e.g., the ToR switches 210, 212, 216, 218), the HMS 208, 214 uses IP-based access to power supplies of the physical rack 202, 204. For example, the HMS 208, 214 can hard reset a switch when it is non-responsive such that an in-band power cycle is not possible via the switch's CLI.

During a power cycle, OS images that are pre-stored (e.g., pre-flashed) in the servers and switches of the physical resources 224, 226 are bootstrapped by default. As part of the bootstrap procedure, the HMS 208, 214 points the boot loader to the server or switch image located on a memory device (e.g., a flash memory, a magnetic memory, an optical memory, a Serial Advanced Technology Attachment (SATA) Disk-on-Module (DOM), etc.) and provides the boot loader with any additional parameters pertinent to the bootup of a booting server or switch. For instances in which a network-based boot is required, the HMS 208, 214 is capable of altering boot parameters to use PXE boot for servers and Trivial File Transfer Protocol (TFTP)/Open Network Install Environment (ONIE) for switches.

In examples disclosed herein, after the boot up process the HMS 208, 214 validates that server nodes and the ToR switches 210, 212, 216, 218 have been properly bootstrapped with correct OS images and are ready to be declared functional. The example HMS 208, 214 does this by logging in to the server hosts, validating the OS versions, and analyzing the logs of the server hosts for any failures during bootup. In examples disclosed herein, the HMS 208, 214 also runs basic operability/configuration tests as part of the validation routine. In some examples, the HMS 208, 214 performs a more exhaustive validation to confirm that all loaded drivers are compliant with a hardware compatibility list (HCL) provided by, for example, the virtual system solutions provider 110 (FIG. 1). The example HMS 208, 214 also runs a switch validation routine as part of a switch thread to verify that the boot configurations for the ToR switches 210, 212, 216, 218 are applied. For example, the HMS 208, 214 validates the OS versions in the ToR switches 210, 212, 216, 218 and tests ports by running link tests and ping tests to confirm that all ports are functional. In some examples, the HMS 208, 214 performs more exhaustive tests such as bandwidth availability tests, latency tests, etc.

An example definition of an example server object 632 for use in connection with examples disclosed herein is shown below in Table 4. The example server object 632 defined in Table 4 encapsulates information obtained both statically and dynamically using IB/CIM and OOB/IPMI mechanisms. In examples disclosed herein, the static information is primarily used for resource provisioning, and the dynamic information is used for monitoring status and health of hardware using upper layers in the VRM 225, 227. In some examples, the PRM 518 does not store events or alarms. In such examples, the PRM 518 relays information pertinent to events or alarms to the VRM 225, 227 and/or a Log Insight module (e.g., a module that provides real-time log management for virtual environments).

TABLE 4

| Example Definition of Server Object |
| --- |
| IPMI Device ID |
| MAC address of Management Port |
| IP Address |
| vRACK Server ID (P0, H0) [Physical Rack 0, Host 0] |
| Hardware Model |
| Power State |
|    On/Off |

TABLE 4-continued

Example Definition of Server Object

CPU
    Vendor
    Frequency
    Cores
    HT
    Errors
Memory
    Size
    Type
    Vendor
    ECC
    Cache size
    Status
    Errors
Disk[x]
    Vendor
    Type
    Capacity
    Driver
    Status
    Errors
NIC[x]
    Type 1 G/10 G/40 G
    NumPorts
    Vendor
    Driver
    Linkstate
    ToR Port (P0, S0, X0)(Port number connected on the ToR switch)
    Status
    Errors
Sensors
    Temperature
    Power
Provisioned
    Yes/No
Boot State
    Yes/No
OS Version
Firmware Version
BIOS Version
License
HCL compliant
Timestamps[]
    Lastboot
Fault Domain Group An example definition of an example switch object 634 for use in connection with examples disclosed herein is shown below in Table 5. The example switch object 634 defined in Table 5 encapsulates both static and dynamic information. In examples disclosed herein, the static information is primarily used to make sure that network resources are available for a provisioned server host. Also in examples disclosed herein, the dynamic information is used to monitor health of the provisioned physical network. Also in examples disclosed herein, a configuration information buffer is used for switch-specific configurations.

TABLE 5

Example Definition of Switch Object

Chassis ID
MAC Address of Management Port
Management IP Address
vRACK Switch ID (P0, S0) [Physical Rack 0, Switch 0]
Hardware Model
Power State
On/Off
Provisioned
    Yes/No
Boot State
    Yes/No TABLE 5-continued Example Definition of Switch Object Switch Ports[X]
    Speed [1 G/10 G/40 G/100 G]
    Link State [Up/Down]
    Host Port [P0, H0, N1] [Port identifier of the host]
    Historical Stats[]
        In/Out Packets
        In/Out Drops
OS Version
Firmware Version
Timestamps
    Lastboot
Fault Domain Group
Switch Configuration File Static [Vendor Type]
(This is a vendor-specific configuration file. This property points to a text file name having a
switch configuration. This is bundled as part of the
HMS Application (e.g., used to run the HMS 208, 214).
The Static Switch Configuration File lists commands to
be applied and also files to be copied (e.g., pointers to
configuration-specific files).)
Switch Configuration File Dynamic [Vendor Type]
(This is a vendor-specific configuration file. This property
points to a text file name having a switch configuration.
The Dynamic Switch Configuration File is downloaded at
runtime from the PRM 518 of the VRM 225, 227.)

In examples disclosed herein, example server properties managed by the HMS 208, 214 are shown in Table 6 below.

TABLE 6

Server Properties Table

| Property | OOB | IB | Use |
|---|---|---|---|
| Chassis Serial Number | Y | | Used to identify inventory |
| Board Serial Number | Y | | Same as above-second level check |
| Management Mac | Y | | Chassis identifier on the network |
| Management IP | Y | | Network Connectivity to management port |
| Power State [S0-S5] | Y | | [Low Priority] Only if there is a power surge while provisioning we can set server low power states. |
| Power ON/OFF/ Power Cycle/Reset | Y | | Ability to power on and off servers |
| CPU (Cores, Frequency) | Y | | Use as input for workload resource requirements |
| Memory (Size, Speed, Status) | Y | As above | |
| NIC<br>Speed<br>Link Status<br>Firmware<br>Version<br>MAC Address<br>PCI Device ID<br>PCI SBF<br>HW capabilities<br>    TSO,<br>    LRO,<br>    VXLAN<br>    offloads,<br>    CSUM<br>    DCB<br>    IPV6<br>    CSUM | Partial | Y | As above (OOB can get MAC address) |

TABLE 6-continued

Server Properties Table

| Property | OOB | IB | Use |
|---|---|---|---|
| DISK<br>  Size<br>  Device<br>  Availability<br>  Status<br>  Vendor<br>  Model<br>  Type<br>  DeviceID<br>  Driver version<br>  Firmware<br>  version | Partial | Y | As above (OOB has HDD status sensors described in Sensors) |
| SMART data for Disks (Self-Monitoring, Analysis, and Reporting) Value/Threshold<br>  Health Status<br>  Media Wearout Indicator<br>  Write Error Count<br>  Read Error Count<br>  Power-on Hours<br>  Power Cycle Count<br>  Raw Read Error Rate<br>  Drive Temperature<br>  Driver Rated Max Temperature<br>  Initial Bad Block Count<br>  SSD specific wearlevelling indicators | n | | Resiliency algorithm input |
| CPU Firmware version | Y | | Check for updated versions |
| CPU Firmware upgrade | Y | | Ability to upgrade CPU firmware |
| BIOS upgrade | Y | | Ability to upgrade BIOS |
| Sensors (CPU/Memory/Power/HDD)<br>  Processor Status (Thermal Trip-Used to identify cause of server reset)<br>  CATERR processor<br>  DIMM Thermal Trip-Same as above<br>  Hang in POST failure<br>  Processor Status in case of unresponsive CPU<br>  HDD Status<br>  Firmware update status<br>  Power Unit Status (Power Down)<br>  BMC self test | Y | | HW analytics/OAM |
| POST tests<br>  Microcode update failed<br>  Processor init fatal errors<br>  DIMM major failures<br>  DIMM disabled<br>  DIMM SPD failure<br>  BIOS corrupted<br>  PCIe PERR Parity errors<br>  PCIe resource conflict<br>  NVRAM corruptions<br>  Processor BIST failures<br>  BMC controller failed<br>  ME failure<br>(Grizzly pass Technical Product Specification Appendix E has all the POST errors) | Y | | Used for HW validation POST errors are logged to SEL |
| System Event Logs [SEL]<br>  DIMM Thermal Margin critical threshold<br>  Power Supply Status: Failure detected, Predictive failure<br>  Processor Thermal Margin critical threshold<br>  NIC controller temperature critical threshold<br>  SAS module temperature critical threshold | Y | | LogInsight/HW Analytics Log events for critical hardware failures and critical thresholds |
| User Name /Password for BMC access | Y | | Create user credentials for OOB access |
| NIC Firmware update | N | Y | Firmware updates use the NIC drivers |
| SSD firmware update | N | Y | SSD driver dependency |

In examples disclosed herein, example switch properties managed by the HMS 208, 214 are shown in Table 7 below.

TABLE 7

Switch Properties Table

| Property | Use |
|---|---|
| Chassis Serial Number | Identify Inventory |
| Management Port MAC | Network Identity of ToR |
| Management Port IP address | Provide Network Reachability to ToR |
| Port Properties [Num Ports] Admin Status, Link Status, Port Type | Use as input for workload resource requirements |

TABLE 7-continued

Switch Properties Table

| Property | Use |
| --- | --- |
| Port Statistics | Calculate in-use and free bandwidth and identify choke points using drop counters and buffer statistics |
| OS version | Use for Upgrades |

Figure 7:
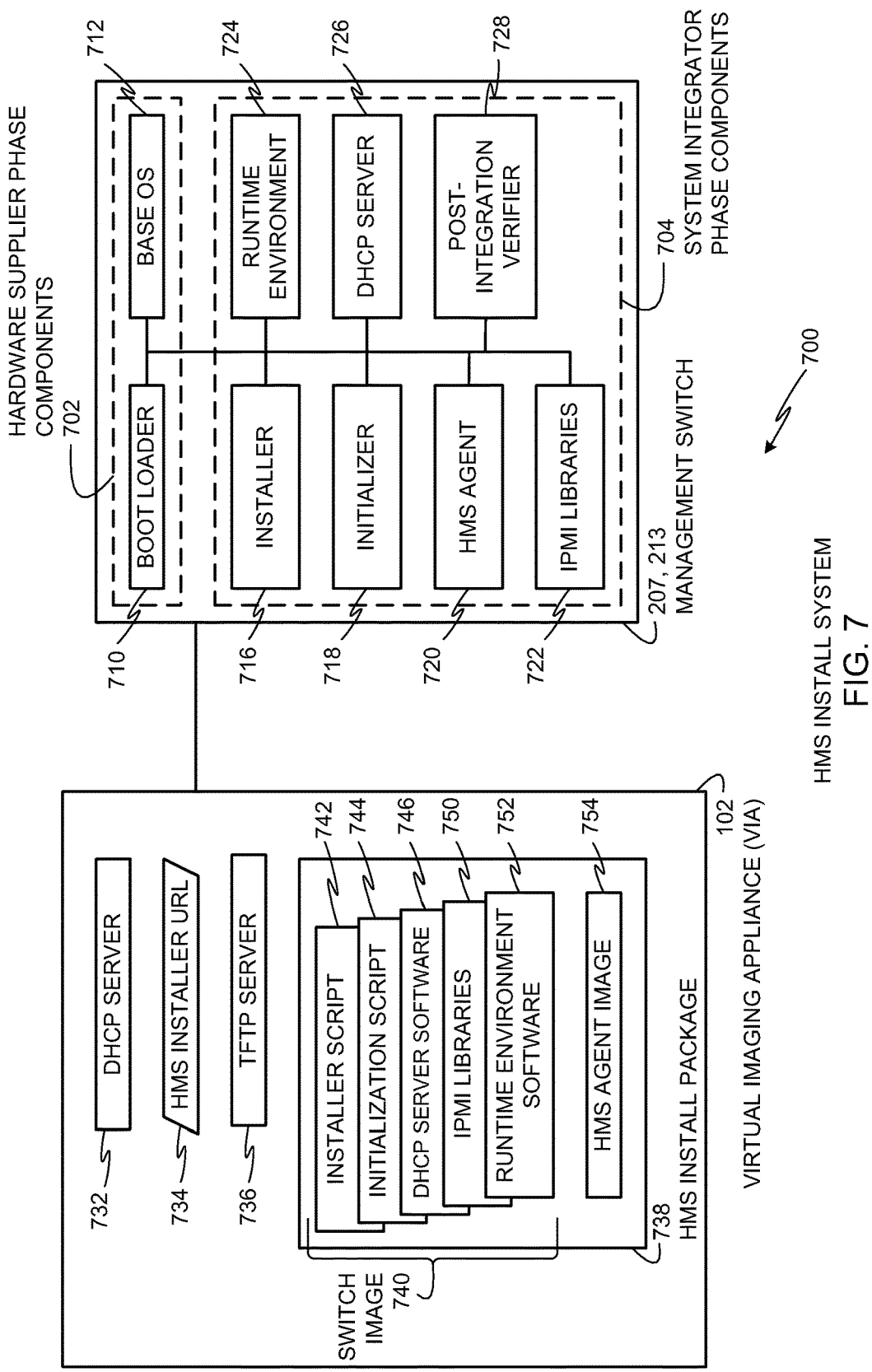
FIG. 7 is an example HMS install system that may be used to setup and instantiate the HMS of FIGS. 2-5 on a corresponding management switch.

FIG. 7 is an example HMS install system 700 that may be used to setup and instantiate the HMS 208, 214 (FIGS. 2-6) on the corresponding management switch 207, 213 (FIG. 2). The HMS install system 700 of the illustrated example includes the management switch 207, 213 in communication with the VIA 102. In the illustrated example, the management switch 207, 213 includes hardware supplier phase components 702 and system integrator phase components 704 to enable the management switch 207, 213 to install and run the HMS 208, 214. In examples disclosed herein, the system integrator 104 of FIG. 1 installs the HMS 208, 214 in the management switch 207, 213. In this manner, the system integrator 104 may use any of a number of hardware suppliers 106 to obtain ODM hardware such as the management switch 207, 213 and install the HMS 208, 214 for use in setting up and running virtual server racks such as the virtual server rack 206. However, in other examples, any other suitable entity (e.g., the hardware supplier 106, a customer, etc.) may install the HMS 208, 214 based on the components described in connection with FIG. 7.

In the illustrated example of FIG. 7, the hardware supplier phase components 702 are provided (e.g., installed, configured, etc.) in the management switch 207, 213 by the hardware supplier 106 (e.g., an ODM, an OEM, etc.) of the management switch 207, 213. For example, the hardware supplier 106 may install and/or configure hardware and/or software in the management switch 207, 213 to provide the hardware supplier phase components 702. The hardware supplier phase components 702 of the illustrated example include an example boot loader 710 and an example base OS 712. The example boot loader 710 is a set of instructions to boot the example base OS 712 when the management switch 207, 213 is powered on. The example base OS 712 provides the management switch 207, 213 with sufficient functionality and compute resource management (e.g., memory, network interface card, ports, etc.) for network communications and to install and/or configure the system integrator phase components 704 in the management switch 207, 213. For example, the ONIE OS may be used to implement the base OS 712 to provide such capabilities to the management switch 207, 213 when the system integrator 104 powers on the management switch 207, 213.

The system integrator phase components 704 of the illustrated example are provided (e.g., installed, configured, etc.) in the management switch 207, 213 by the system integrator 104 after the system integrator 104 obtains the management switch 207, 213 from the hardware supplier 106. For example, the system integrator 104 may install and/or configure hardware and/or software in the management switch 207, 213 to provide the system integrator phase components 704. The system integrator phase components 704 of the illustrated example include an example installer 716, an example initializer 718, an example HMS agent 720, example IPMI libraries 722, an example runtime environment 724, an example DHCP server 726, and an example post-integration verifier 728.

The installer 716 of the illustrated example is provided to install the runtime environment 724 on the management switch 207, 213 and install the example IPMI libraries 722 and the HMS agent 720 in predetermined locations on a file system of the management switch 207, 213. The initializer 718 of the illustrated example is provided to configure a default management network on the management switch 207, 213, to start HMS daemons, and to start the DHCP server 726. The example management switch 207, 213 executes the example HMS agent 720 to instantiate and run the HMS 208, 214 on the management switch 207, 213. Thus, in the illustrated example, the HMS agent 720 implements the HMS 208, 214. The example IPMI libraries 722 provide vendor-specific plugin interfaces (e.g., vendor-specific plugin interfaces 614 of FIG. 6) to interface with corresponding physical hardware resources 224, 226. The runtime environment 724 of the illustrated example is implemented using a Java Development Kit (JDK) environment. However, any other suitable runtime environment may be used. In the illustrated example, the example management switch 207, 213 runs the DHCP server 726 to provide internal management IP addresses to the ToR switches 210, 212, 216, 218, other switches (e.g., the one or more physical switches 618 of FIG. 6), and to server hosts (e.g., the one or more physical servers 616 of FIG. 6) of the physical hardware resources 224, 226. The post-integration verifier 728 of the illustrated example is provided to confirm successful configuration of components managed by the management switch 207, 213 before the physical rack 102, 202, 204 is shipped to a customer. For example, the post-integration verifier 728 also verifies successful installations and troubleshoots for any install failures and/or logged errors.

In the illustrated example, when the system integrator 104 powers on the management switch 207, 213 to begin installation of the HMS 208, 214 on the management switch 207, 213, the boot loader 710 boots the base OS 712. The example base OS 712 causes the management switch 207, 213 to communicate with the VIA 102 (e.g., via an Ethernet network connection, via a universal serial bus (USB) connection, or via any other suitable communication interface) to obtain an Internet protocol (IP) address to enable the management switch 207, 213 for network communications. In the illustrated example, the management switch 207, 213 and the VIA 102 are co-located at a same geographic location (e.g., in a same room or building) and are connected via an Ethernet network connection, a USB connection, or any other suitable type of connection for co-located devices. In other examples, the management switch 207, 213 and the VIA 102 are located separate from one another at different geographic locations and are connected to one another via an Internet-capable network connection. In the illustrated example of FIG. 7, the VIA 102 is provided with an example DHCP server 732 to assign the management switch 297, 213 with an IP address. In addition, the VIA 102 of the illustrated example is provided an example HMS installer uniform resource locator (URL) 734, an example TFTP server 736, and an example HMS install package 738 (e.g., an HMS software install bundle). The example HMS installer URL 734 is an address of the example TFTP server 736 of the VIA 102 from which the management switch 207, 213 can retrieve the example HMS install package 738. That is, in the illustrated example, the HMS installer URL 734 is a network-accessible location of the TFTP server 736 from which the components of the HMS install package 738 can be retrieved by the management switch 207, 213 using a TFTP transfer protocol. Alternatively, in other examples, the TFTP server 736 may instead be implemented using any other suitable network transfer protocol. In addition, in other examples, the TFTP server 736 (or any other suitable type of server) and the HMS install package 738 may be located on a device other than the VIA 102 and may be remotely located at a different geographic site separate from the management switch 207, 213 such that the HMS installer URL 734 is an Internet-based URL so that the management switch 207, 213 obtains the HMS install package 738 from a storage location accessible over the Internet.

In the illustrated example, the management switch 207, 213 uses the HMS installer URL 734 to retrieve the HMS install package 738 from the VIA 102 using the TFTP server 736. The HMS install package 738 of the illustrated example enables the management switch 207, 213 to install and/or configure one or more of the system integrator phase components 704 when the system integrator 104 is operating the management switch 207, 213 to install the HMS 208, 214. In the illustrated example, the HMS install package 738 is an HMS software install bundle packaged as an independent Java application with an associated set of runtime JDK components, intelligent platform management interface (IPMI) libraries, and tools. In other examples, the HMS install package 738 may be packaged using any other programming language for use with any other runtime environment.

By providing the HMS install package 738 in the VIA 102 to configure and/or install the system integrator phase components 704 in the management switch 207, 213, the virtual system solutions provider 110 can provide the VIA 102 to the system integrator 104 for configuring and deploying virtual server racks (e.g., the virtual server rack 206 of FIG. 2) to customers using physical racks 102, 202, 204 (FIGS. 1 and 2) from any of a number of hardware suppliers 106 (FIG. 1) without the virtual system solutions provider 110 needing to coordinate particular virtual server rack configurations with the hardware suppliers. That is, in examples disclosed herein, the virtual system solutions provider 110 develops and sells components shown in FIGS. 3-6 to implement the virtual server rack 206 without requiring that such components be limited for use with hardware from a single hardware supplier. Instead, the virtual system solutions provider 110 develops the components of the virtual server rack 206 to operate with hardware from a number of suppliers 106. As such, the virtual system solutions provider 110 provides the example HMS install package 738 in the VIA 102 so that system integrators 104 can use the VIA 102 with hardware from any of numerous hardware suppliers to build the virtual server rack 206. When the virtual system solutions provider 110 changes an aspect of the HMS 208, 214, the virtual system solutions provider 110 can make the change to the HMS install package 738 in the VIA 102. The changed HMS install package 738 is then provided to system integrators in the VIA 102 without the virtual system solutions provider 110 needing to coordinate delivery of the changed HMS install package 738 to numerous hardware suppliers 106. As such, the HMS install system 700 of FIG. 7 in which the VIA 102 stores the HMS install package 738 to configure and/or install the system integrator phase components 704 in the management switch 207, 213 is useful to facilitate deploying the virtual server rack 206 by the system integrator 104 by allowing the system integrator 104 to purchase the VIA 102 from the virtual system solutions provider 110 and source hardware from any of numerous hardware suppliers 106.

In the illustrated example, the HMS install package 738 includes an example switch image 740 that includes an example installer script 742, an example initialization script 744, example DHCP server software 746, example IPMI libraries 750, and example runtime environment software 752. The HMS install package 738 of the illustrated example also includes example HMS agent image 754. In the illustrated example, the management switch 207, 213 obtains the switch image 740 separate from the HMS agent software 748 and subsequently retrieves the HMS agent software 748. In other examples, the management switch 207, 213 retrieves the entire HMS install package 738 from the VIA 102 at once.

In the illustrated example, the installer script 742 is implemented using an HMS agent bootstrap script to instantiate components to prepare the management switch 207, 213 to install and run the HMS agent 208, 214. For example, when executed by the management switch 207, 213, the example installer script 742 causes the installer 716 to install the runtime environment software 752 of the HMS install package 738 to instantiate the runtime environment 724 of the system integrator phase components 704. The example installer script 742 also causes the installer 716 to install the IPMI libraries 750 of the HMS install package 738 to instantiate the IPMI libraries 722 of the system integrator phase components 704. In addition, the example installer script 724 causes the installer 716 to install the HMS agent image 754 of the HMS install package 738 to instantiate the HMS agent 720 of the system integrator phase components 704.

In the illustrated example, when executed by the management switch 207, 213, the initialization script 744 causes the initializer 718 to configure a default management network and start network daemons for use by the management switch 207, 213 to communicate with and manage server hosts and switches of the physical resources 224, 226 and to communicate with and manage the ToR switches 210, 212, 216, 218.

In the illustrated example, the management switch 207, 213 executes the DHCP server software 746 of the HMS install package 738 to instantiate the DHCP server 726 of the system integrator phase components 704 in the management switch 207, 213. The example management switch 207, 213 executes the example HMS agent image 754 of the HMS install package 738 to instantiate and run the HMS 208, 214 in the example runtime environment 724. In the illustrated example, the runtime environment 724 is run by the management switch 207, 213 executing the example runtime environment software 752 of the HMS install package 738. In the illustrated example, the runtime environment software 752 is implemented using a JDK. In other examples, other suitable types of runtime environments may be used instead.

While an example manner of implementing the HMS 208, 214 of FIGS. 2-6 using the management switch 207, 213 of FIGS. 2 and 7 is illustrated in FIG. 7, one or more of the elements, processes and/or devices illustrated in FIG. 7 may be combined, divided, re-arranged, omitted, eliminated and/or implemented in any other way. Further, the example boot loader 710, the example base OS 712, the example installer 716, the example initialize 718, the example HMS agent 720, the example IPMI libraries 722, the example runtime environment 724, the example DHCP server 726, the example post-integration verifier 728 and/or, more generally, the example management switch 207, 213 of FIG. 7 may be implemented by hardware, software, firmware and/or any combination of hardware, software and/or firmware. Thus, for example, any of the example boot loader 710, the example base OS 712, the example installer 716, the example initialize 718, the example HMS agent 720, the example IPMI libraries 722, the example runtime environment 724, the example DHCP server 726, the example post-integration verifier 728 and/or, more generally, the example management switch 207, 213 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example boot loader 710, the example base OS 712, the example installer 716, the example initialize 718, the example HMS agent 720, the example IPMI libraries 722, the example runtime environment 724, the example DHCP server 726, and/or the example post-integration verifier 728 is/are hereby expressly defined to include a tangible computer readable storage device or storage disk such as a memory, a digital versatile disk (DVD), a compact disk (CD), a Blu-ray disk, etc. storing the software and/or firmware. Further still, the example management switch 207, 213 of FIGS. 2 and 7 may include one or more elements, processes and/or devices in addition to, or instead of, those illustrated in FIG. 7, and/or may include more than one of any or all of the illustrated elements, processes and devices.

Figure 8:
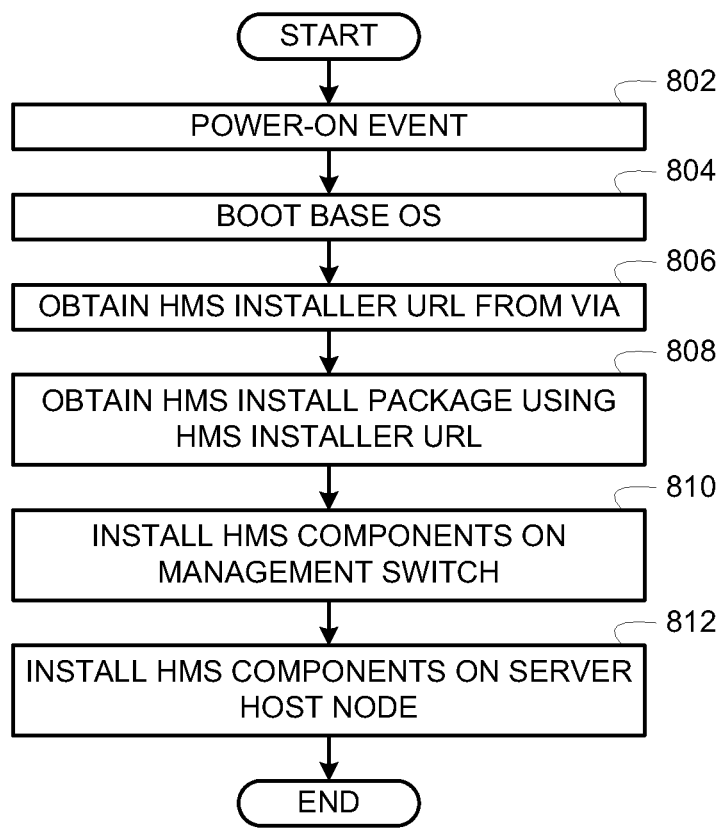
FIG. 8 is a flowchart representative of example machine readable instructions that may be executed to implement the example management switch of FIGS. 2 and 7 to setup and instantiate the HMS of FIGS. 2-5.
Figure 9A:
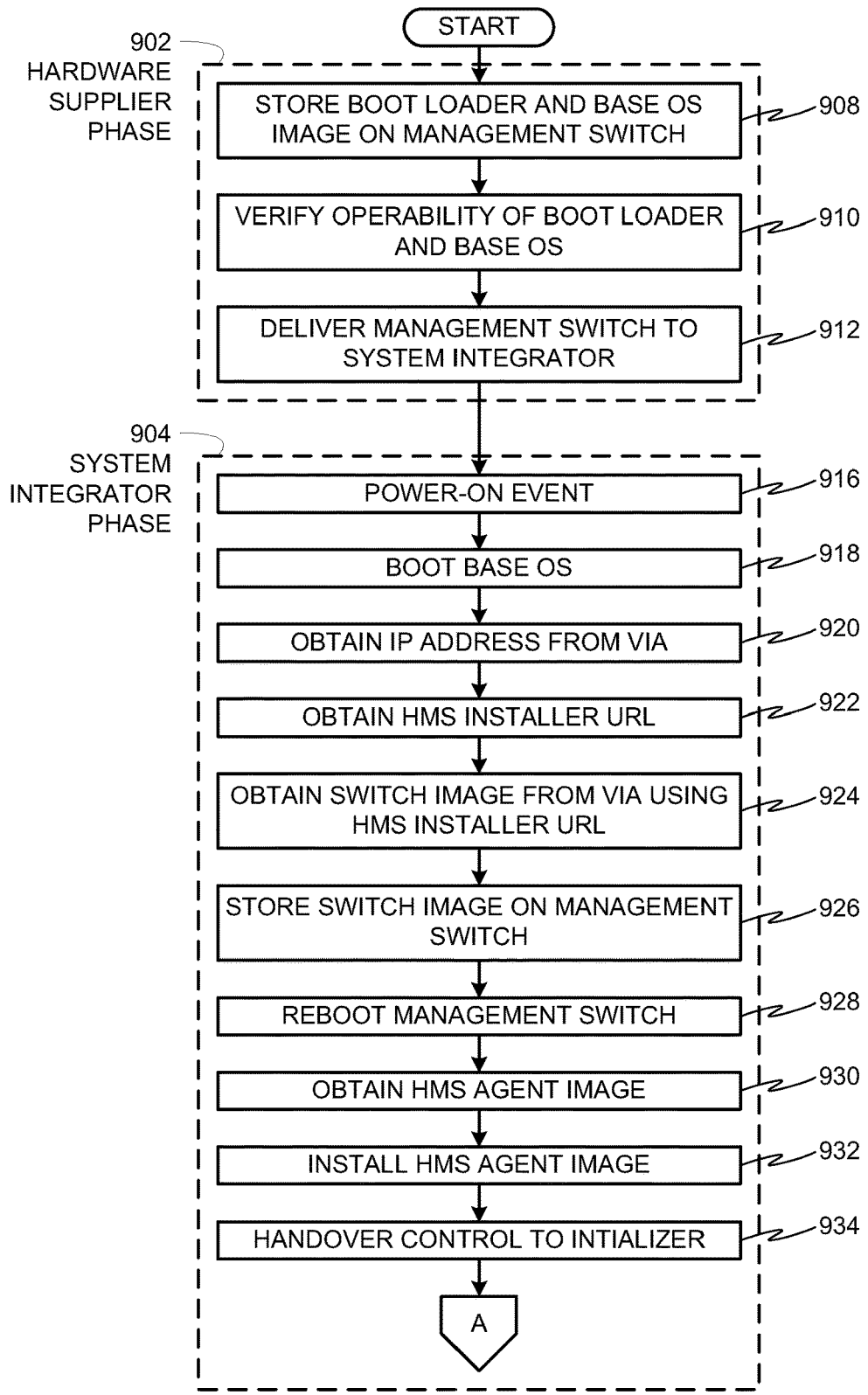
FIGS. 9A and 9B depict another flowchart representative of example machine readable instructions that may be executed to implement the example management switch of FIGS. 2 and 7 to setup and instantiate the HMS of FIGS. 2-5.
Figure 9B:
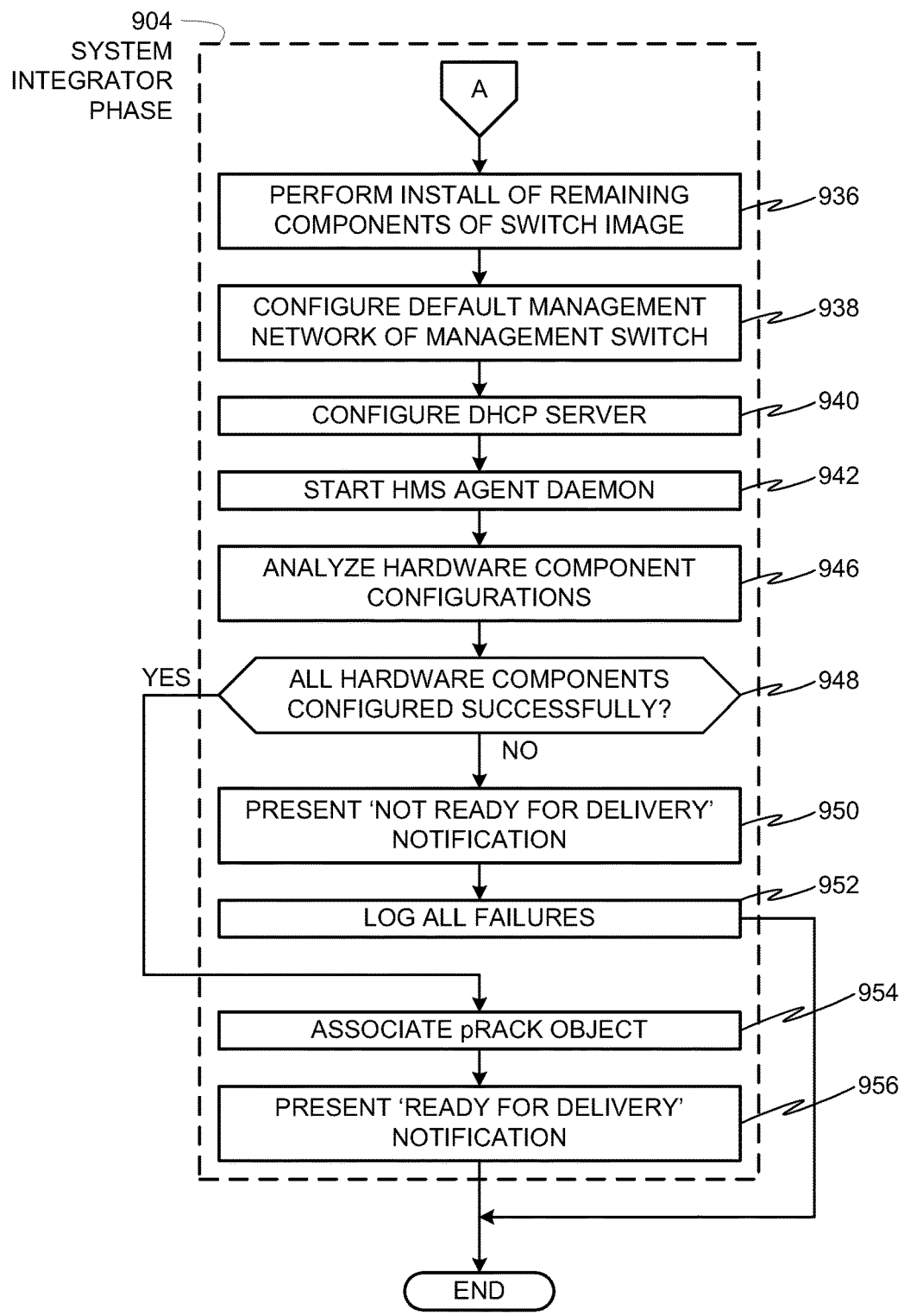

FIG. 8 is a flowchart representative of example machine readable instructions that may be executed to implement the example management switch 207, 213 of FIGS. 2 and 7 to setup and instantiate the HMS 208, 214 of FIGS. 2-5. FIGS. 9A and 9B depict another flowchart representative of example machine readable instructions that may be executed to implement the example management switch 207, 213 of FIGS. 2 and 7 to setup and instantiate the HMS 208, 214 of FIGS. 2-5. In these examples, the machine readable instructions include one or more programs for execution by a processor such as the processor 1012 shown in the example processor platform 1000 discussed below in connection with FIG. 10. The program(s) may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program(s) is/are described with reference to the flowcharts illustrated in FIGS. 8, 9A, and 9B, many other methods of implementing the example management switch 207, 213 of FIG. 7 may alternatively be used. For example, the order of execution of the blocks may be changed, and/or some of the blocks described may be changed, eliminated, or combined.

As mentioned above, the example processes of FIGS. 8, 9A, and 9B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8, 9A, and 9B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program of FIG. 8 begins at block 802 at which the management switch 207, 213 receives a power-on event. For example, the power-up event is based on electrical power being applied to the management switch 207, 213. The example boot loader 710 (FIG. 7) boots the example base OS 712 (FIG. 7) in the management switch 207, 213 (block 804). The example base OS 712 obtains the HMS installer URL 734 (FIG. 7) (block 806). For example, the base OS 712 may be provided with an install routine to send a request to the VIA 102 (FIG. 7) for the HMS installer URL 734. In the illustrated example, the boot loader 710 installs the base OS 712, and the base OS 712 obtains the HSM installer URL 734 in response to the power-on event such that the boot loader 710 is one of the first processes executed on the management switch 207, 213 to load the base OS 712 when, for example, the system integrator 104 (FIG. 1) first powers on the management switch 207, 213.

The example base OS 712 obtains the HMS install package 738 (FIG. 7) using the HMS installer URL 734 (block 808). In the illustrated example, the HMS installer URL 734 is a network-accessible location of the TFTP server 736 of the VIA 102 for retrieving the HMS install package 738 from the VIA 102. However, in other examples, the HMS install package 738 may be stored on a device other than the VIA 102 and may be remotely located at a different geographic site separate from the management switch 207, 213 such that the HMS installer URL 734 is an Internet-based URL so that the management switch 207, 213 obtains the HMS install package 738 from a storage location over the Internet.

A processor (e.g., the example processor 912 of FIG. 9) of the management switch 207, 213 installs components of the HMS 208, 214 on the management switch 207, 213 (block 810). For example, the processor 912 installs the OOB agent 612 (FIG. 6) and the OOB plugin 621 (FIG. 6) of the HMS 208, 214 on the management switch 207, 213 using the HMS install package 738. In some examples, the example base OS 712 stores (e.g., flashes) the HMS install package 738 or a portion thereof on the management switch 207, 213 so that the processor 912 can use the components of the HMS install package 738 to install the HMS 208, 214. A processor (e.g., the example processor 912 of FIG. 9) of the management switch 207, 213 installs components of the HMS 208, 214 on the server host node(0) 209, 211 (FIG. 2) (block 812). For example, the processor 912 installs the generic HMS service APIs 610 (FIG. 6), the HMS aggregator 611 (FIG. 6), the IB agent 613 (FIG. 6), and the IB plugin 623 of the HMS 208, 214 on the server host node(0) 209, 211 using the HMS install package 738. The example process of FIG. 8 then ends.

In the illustrated example, after the HMS 208, 214 is installed and runs successfully on the management switch 207, 213 and the server host node(0) 209, 211, the system integrator 104 can deliver the management switch 207, 213 and the server host node(0) 209, 211 in the physical rack 102, 202, 204 to a customer for use in deploying the virtual rack 206. In some examples, at the customer site, the management switch 207, 213, the server host node(0) 209, 211, and the internal management network are not visible to the customer. In such examples at the customer site, when the management switch 207, 213 and the server host node(0) 209, 211 are booted and are up and running, the HMS 208, 214 first connects with the VRM 225, 227 (FIGS. 2, 4, 5), obtains the pRack object state of the generic pRack object 624 (FIG. 6) of the PRM 518, and validates that the generic pRack object 624 is functional. Such validation based on the pRack object state facilitates substantially reducing or eliminating the likelihood of failures that may occur in transit of the management switch 207, 213, the server host node(0) 209, 211, and/or the physical rack 102, 202, 204 from the system integrator 104 to the customer. Once functionality of the generic pRack object 624 is confirmed, the HMS 208, 214 is ready to be in service for further configuration of the ToR switches 210, 212, 216, 218 (FIGS. 2 and 3) and management of server objects (e.g., server objects 632 of FIG. 6).

Turning now to FIGS. 9A and 9B, the illustrated example includes an example hardware supplier phase 902 and an example system integrator phase 904. In the illustrated example of FIGS. 9A and 9B, example operations of the hardware supplier phase 902 are performed by the hardware supplier(s) 106 before supplying the management switch 207, 213 and the server host node(0) 209, 211 of FIG. 2 to the system integrator 104. Also in the illustrated example of FIGS. 9A and 9B, example operations of the system integrator phase 904 are performed by the system integrator 104 after obtaining the management switch 207, 213 and the server host node(0) 209, 211 from the hardware supplier(s) 106.

The example program of FIGS. 9A and 9B begins at block 908 (FIG. 9A) at which the hardware supplier 106 stores the boot loader 710 and the base OS 712 (FIG. 7) in the management switch 207, 213. For example, the hardware supplier 106 may store the boot loader 710 and the base OS 712 on a flash memory, a magnetic memory, or any other suitable type of memory of the management switch 207, 213 and sets any platform dependent environment variables to the particular base OS 712 (e.g., ONIE). In the illustrated example, the hardware supplier 106 verifies the operability of the boot loader 710 and the base OS 712 (block 910). In the illustrated example, the hardware supplier 106 delivers the management switch 207, 213 to the system integrator 104 (block 912).

The example system integrator phase 904 of FIGS. 9A and 9B begins at block 916 at which the management switch 207, 213 receives a power-on event. For example, the power-up event is based on electrical power being applied to the management switch 207, 213. The example boot loader 710 (FIG. 7) boots the example base OS 712 (FIG. 7) in the management switch 207, 213 (block 918). The example base OS 712 obtains an IP address from the VIA 102 (FIG. 7) (block 920). For example, the base OS 712 may send a DHCP request to the DHCP server 732 of the VIA 102 to acquire an IP address. The example base OS 712 obtains the HMS installer URL 734 (FIG. 7) (block 922). For example, the base OS 712 may be provided with an install routine to send a request to the VIA 102 for the HMS installer URL 734. In the illustrated example, the boot loader 710 installs the base OS 712, and the base OS 712 obtains IP address and the HSM installer URL 734 in response to the power-on event such that these operations are among the first ones executed on the management switch 207, 213.

The example base OS 712 obtains the switch image 740 (FIG. 7) using the HMS installer URL 734 (block 924). In the illustrated example, the HMS installer URL 734 is a network-accessible location of the TFTP server 736 of the VIA 102 for retrieving the components of the HMS install package 738 from the VIA 102. However, in other examples, the components of the HMS install package 738 may be stored on a device other than the VIA 102 and may be remotely located at a different geographic site separate from the management switch 207, 213 such that the HMS installer URL 734 is an Internet-based URL so that the management switch 207, 213 obtains the components of the HMS install package 738 from a storage location over the Internet.

The example base OS 712 stores the switch image 740 on the management switch 207, 213 (block 926). For example, the base OS 712 may store the switch image 740 on a flash memory, a magnetic memory, or any other suitable memory (e.g., the read only memory 1016, the mass storage memory 1028 of FIG. 10). The base OS 712 reboots the management switch 207, 213 (block 928). In the illustrated example, an install routine provided in the base OS 712 performs the operations of blocks 920, 922, 924, 926, and 928. However, after the switch image 740 is stored in the management switch 207, 213 and the management switch 207, 213 reboots, the example system integrator phase components 704 (FIG. 7) take control to install and configure the HMS 208, 214 in the management switch 207, 213.

In the illustrated example, after reboot, the installer 716 (FIG. 7) obtains the HMS agent image 754 (FIG. 7) (block 930). In the illustrated example, the installer 716 obtains the HMS agent image 754 from the VIA 102 using the HMS installer URL 734. However, in other examples, the HMS agent image 754 may be stored on any other device at the same geographic site as the management switch 207, 213 or a different geographic site separate from the management switch 207, 213. As such, the installer 716 may obtain the HMS agent image 754 from the VIA 102 or any other device using a network and/or the Internet. The installer 716 of the illustrated example installs the HMS agent image 754 in the management switch 207, 213 (block 932). The example installer 716 hands over control to the example initializer 718 (FIG. 7) (block 934).

Turning to FIG. 9B, the example initializer 718 finishes completing the installation of the remaining components of the switch image 740 (block 936). For example, the example initializer 718 installs the OOB agent 612 (FIG. 6) and the OOB plugin 621 (FIG. 6) of the HMS 208, 214 on the management switch 207, 213. The example initialize 718 also installs the generic HMS service APIs 610 (FIG. 6), the HMS aggregator 611 (FIG. 6), the IB agent 613 (FIG. 6), and the IB plugin 623 of the HMS 208, 214 on the server host node(0) 209, 211. In addition, the example initialize 718 uses the DHCP server software 746 of the HMS install package 738 to install/configure the DHCP server 726 of the system integrator phase components 704, uses the IPMI libraries 750 of the HMS install package 738 to install/configure the IPMI libraries 722 of the system integrator phase components 704, and uses the runtime environment software 752 of the HMS install package 738 to install/ configure the runtime environment 724 of the system integrator phase components 704. The example initializer 718 also installs/configures the post-integration verifier 728. In the illustrated example, when finishing the installation of the switch image 740, the initializer 718 also verifies that the installation was successful and logs errors if any aspect of the switch image install was unsuccessful. In some examples, the initializer 718 also logs steps for use in debugging the faulty installation.

The example initializer 718 configures the default management network of the management switch 207, 213 (block 938). For example, the configuration for the default management network of the management switch 207, 213 is packaged as part of the HMS install package 738. For example, such configuration may be part of the initialization script 744 (FIG. 7). The example default management network is an internal network to facilitate communication between the HMS 208, 214 and the VRM 225, 227 (FIGS. 2, 4, and 5) and to provide reachability to the ToR switches 210, 212, 216, 218 (FIGS. 2 and 3), the physical server(s) 616 (FIG. 6), the physical switch(es) 618 (FIG. 6), the external storage 620 (FIG. 6), and/or any other physical resources 224, 226 (FIGS. 2-5) of the physical rack 202, 204 (FIG. 2).

The example initializer 718 configures the DHCP server 726 (block 940) of the management switch 207, 213. In this manner, the management switch 207, 213 can use the DHCP server 726 to assign IP addresses to the ToR switches 210, 212, 216, 218, the physical server(s) 616, the physical switch(es) 618, the external storage 620, and/or any other physical resources 224, 226 of the physical rack 202, 204.

The example initializer 718 starts an HMS agent daemon (block 942). In the illustrated example, the management switch 207, 213 uses the HMS agent daemon to discover hardware resources in the physical rack 202, 204. For example, the management switch 207, 213 uses the HMS agent daemon to send RMCP pings for IPMI discovery of the ToR switches 210, 212, 216, 218, the physical server(s) 616, the physical switch(es) 618, the external storage 620, and/or any other physical resources 224, 226 of the physical rack 202, 204 based on IP address ranges for such hardware. In this manner, the HMS agent daemon can perform validation and configuration steps for the discovered hardware in the physical rack 202, 204.

The example post-integration verifier 728 (FIG. 7) analyzes hardware component configurations of the physical rack 202, 204 (block 946). For example, the post-integration verifier 728 analyzes the ToR switches 210, 212, 216, 218, the physical server(s) 616, the physical switch(es) 618, the external storage 620, and/or any other physical resources 224, 226 of the physical rack 202, 204 to determine whether they have all been configured correctly. In the illustrated example, if the example post-integration verifier 728 determines that all hardware components of the physical rack 202, 204 are not configured successfully (block 948), the post-integration verifier 728 causes the management switch 207, 213 to present a 'Not Ready For Delivery' notification (block 950). In the illustrated example, the 'Not Ready For Delivery' notification or any other similar or suitable notification is used to notify the system integrator 104 that the physical rack 202, 204 was not successfully configured and that the physical rack 202, 204 is not ready for delivery to the customer. In addition, the example post-integration verifier 728 logs all failures (block 952) associated with the unsuccessful configuration of the hardware components. For example, the post-integration verifier 728 logs and identifies the types of failures for each hardware component in the physical rack 202, 204 (e.g., the ToR switches 210, 212, 216, 218, the physical server(s) 616, the physical switch(es) 618, the external storage 620, and/or any other physical resources 224, 226 of the physical rack 202, 204). Such types of failures include, for example, installation failures, boot failures, network failures, hardware failures, imaging failures, HMS software failures, VRM failures, etc.

In the illustrated example, if the example post-integration verifier 728 determines that all components of the system integrator phase components 704 are configured successfully (block 948), the initializer 718 associates the HMS 208, 214 with the example generic pRack object 624 (FIG. 6) (block 954). In addition, the example post-integration verifier 728 causes the management switch 208, 214 to present a 'Ready For Delivery' notification (block 956). In the illustrated example, the 'Ready For Delivery' notification or any other similar or suitable notification is used to notify the system integrator 104 that the physical rack 202, 204 was successfully configured and that the physical rack 202, 204 is ready for delivery to the customer. The example process of FIGS. 9A and 9B then ends.

Figure 10:
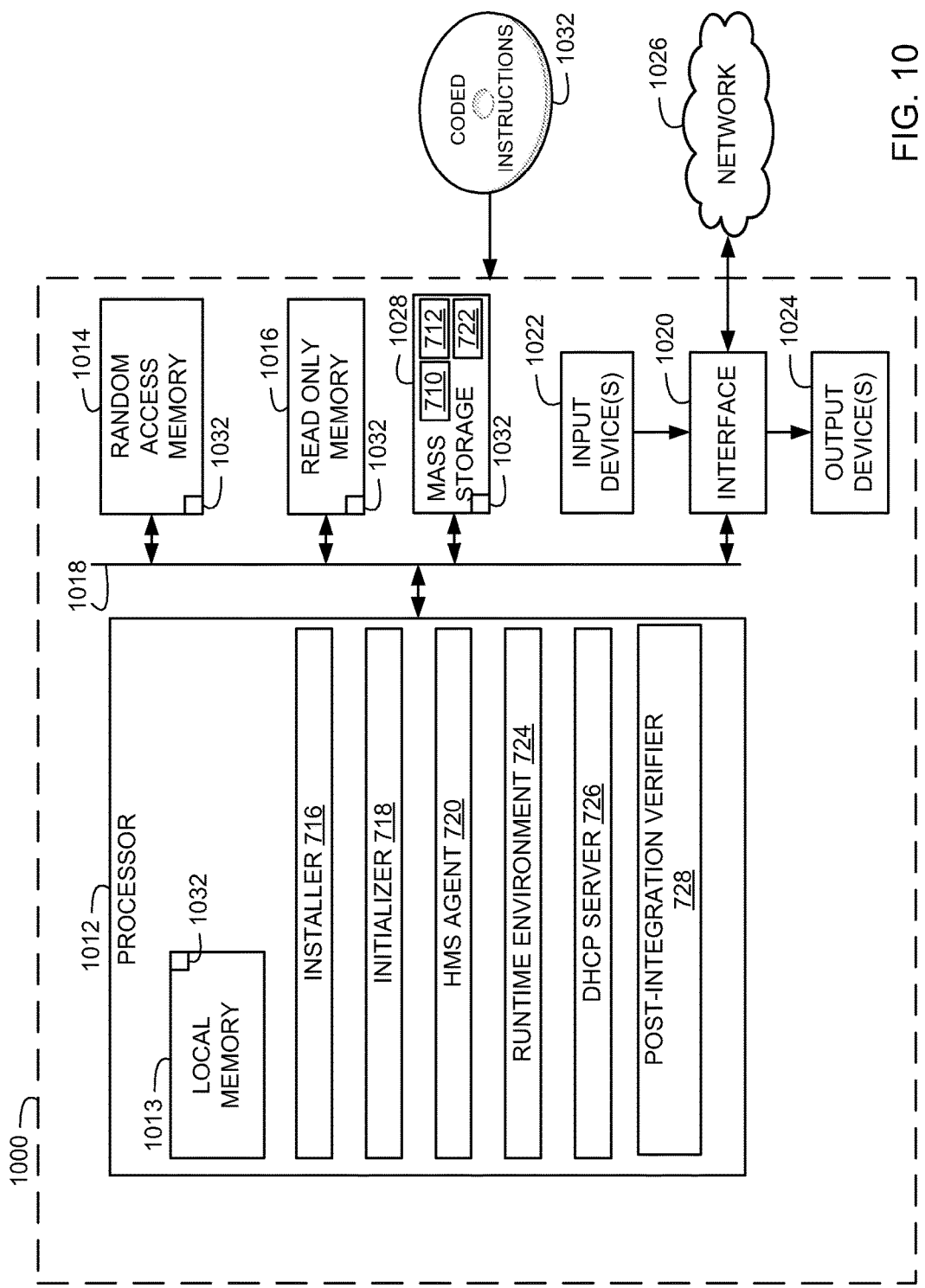
FIG. 10 is a block diagram of an example processing platform capable of executing the example machine-readable instructions of FIGS. 8, 9A, and 9B to implement the example management switch of FIGS. 2 and 7.

FIG. 10 is a block diagram of an example processor platform 1000 capable of executing the instructions of FIGS. 8, 9A, and 9B to implement the management switch 207, 213 of FIGS. 2 and/or 7. The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache), and executes instructions to implement the example installer 716, the example initialize 718, the example HMS agent 720, the example runtime environment 724, the example network DHCP server 726, and the example post-integration verifier 728. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 920. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include flash devices, floppy disk drives, hard drive disks, optical compact disk (CD) drives, optical Blu-ray disk drives, RAID systems, and optical digital versatile disk (DVD) drives. The example mass storage device 1028 stores the example boot loader 710, the example base OS 712 and the example IPMI libraries 722.

Coded instructions 1032 representative of the example machine readable instructions of FIG. 8 and/or FIGS. 9A, and 9B may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture facilitate the configuration of a virtual server rack by a system integrator. For example, using the example configuration techniques disclosed herein to install an HMS in a management switch enables a system integrator to obtain the HMS components from one vendor (e.g., a virtual system solutions provider) and to obtain hardware from any of a number of hardware suppliers. For example, by providing an HMS install package in a virtual imaging appliance (VIA) to configure and/or install the HMS in a management switch, a virtual system solutions provider can provide the VIA to the system integrator for configuring and deploying virtual server racks to customers using physical racks and hardware from any of a number of hardware suppliers without the virtual system solutions provider needing to coordinate particular virtual server rack configurations with the hardware suppliers. That is, in examples disclosed herein, the virtual system solutions provider develops and sells components to instantiate and run the virtual server rack without requiring that such components be limited for use with hardware from a single hardware supplier. Instead, the virtual system solutions provider develops the components of the virtual server rack to operate with hardware from a number of suppliers. As such, the virtual system solutions provider provides the example HMS install package in the VIA so that system integrators can use the VIA with hardware from any of numerous hardware suppliers to build the virtual server rack. When the virtual system solutions provider changes an aspect of the HMS, the virtual system solutions provider can make the change to the HMS install package in the VIA. The changed HMS install package is then provided to system integrators in the VIA without the virtual system solutions provider needing to coordinate delivery of the changed HMS install package to numerous hardware suppliers. As such, examples disclosed herein are useful to facilitate deploying virtual server racks by system integrators by allowing the system integrators to purchase a VIA from the virtual system solutions provider and source hardware from any of numerous hardware suppliers.

Methods, apparatus, and articles of manufacture to configure hardware management systems for use in virtual server rack deployments for virtual computing environments are disclosed herein. An example method to install a hardware management system on a management switch includes in response to a power-on event of a management switch, executing a boot loader on the management switch to boot an operating system on the management switch. The example method also includes obtaining from a virtual imaging appliance in communication with the management switch a uniform resource locator of a network-accessible location of installer software to install the hardware management system. The virtual imaging appliance is to configure a physical rack of hardware for use as a virtual server rack. The hardware management system is to manage the hardware for use in the virtual server rack.

In some examples, the example method further includes obtaining at the management switch an Internet protocol (IP) address from a dynamic host configuration protocol server running on the virtual imaging appliance.

In some examples, the network-accessible location is a file transfer protocol server on the virtual imaging appliance.

In some examples, the installer software includes a switch image, and installing the hardware management system on the management switch includes storing the switch image on the management switch, rebooting the management switch, and installing on the management switch a hardware management system agent image obtained from the network-accessible location. In some examples, the hardware management system agent image is to instantiate the hardware management system on the management switch.

In some examples, installing the hardware management system on the management switch includes installing a dynamic host configuration protocol server on the management switch to assign Internet protocol addresses to the hardware for use in the virtual server rack.

In some examples, installing the hardware management system on the management switch includes starting a hardware management system agent daemon to discover the hardware in the physical rack.

In some examples, the example method further includes determining whether the hardware in the physical rack is configured successfully.

In some examples, when the hardware in the physical rack is not configured successfully, a notification is presented to indicate that the physical rack is not ready for delivery to a customer.

In some examples, installing the hardware management system on the management switch includes installing an out-of-band agent and an out-of-band plugin on the management switch. In some examples, the example method further includes installing a hardware management system service API, a hardware management system aggregator, an in-band agent, and an in-band plugin on a server host.

An example apparatus to install a hardware management system on a management switch includes a boot loader to, via a processor, boot an operating system on the management switch in response to a power-on event of the management switch. The example apparatus also includes the processor to obtain from a virtual imaging appliance in communication with the management switch a uniform resource locator of a network-accessible location of installer software to install the hardware management system. In such example, the virtual imaging appliance is to configure a physical rack of hardware for use as a virtual server rack, and the hardware management system is to manage the hardware for use in the virtual server rack. The example apparatus also includes an installer to install the hardware management system on the management switch using the installer software obtained from the network-accessible location.

In some examples, the processor is to obtain at the management switch an Internet protocol (IP) address from a dynamic host configuration protocol server running on the virtual imaging appliance.

In some examples, the network-accessible location is a file transfer protocol server on the virtual imaging appliance.

In some examples, the installer software includes a switch image, and installing the hardware management system on the management switch includes storing the switch image on the management switch, rebooting the management switch, and installing on the management switch a hardware management system agent image obtained from the network-accessible location. In some examples, the hardware management system agent image is to instantiate the hardware management system on the management switch.

In some examples, installing the hardware management system on the management switch includes installing a dynamic host configuration protocol server on the management switch to assign Internet protocol addresses to the hardware for use in the virtual server rack.

In some examples, installing the hardware management system on the management switch includes starting a hardware management system agent daemon to discover the hardware in the physical rack.

In some examples, the example apparatus further includes a verifier to determine whether the hardware in the physical rack is configured successfully.

In some examples, when the hardware in the physical rack is not configured successfully, the verifier is to present a notification that the physical rack is not ready for delivery to a customer.

In some examples, installing the hardware management system on the management switch includes installing an out-of-band agent and an out-of-band plugin on the management switch. In some examples, the installer is further to install a hardware management system service API, a hardware management system aggregator, an in-band agent, and an in-band plugin on a server host.

An example article of manufacture comprising computer-readable instructions that, when executed, cause a processor to at least, in response to a power-on event of a management switch, execute a boot loader on the management switch to boot an operating system on the management switch. The example instructions also cause the processor to obtain from a virtual imaging appliance in communication with the management switch a uniform resource locator of a network-accessible location of installer software to install the hardware management system. The virtual imaging appliance is to configure a physical rack of hardware for use as a virtual server rack, and the hardware management system is to manage the hardware for use in the virtual server rack. The example instructions also cause the processor to install the hardware management system on the management switch using the installer software obtained from the network-accessible location.

In some examples, the instructions further cause the processor to obtain at the management switch an Internet protocol (IP) address from a dynamic host configuration protocol server running on the virtual imaging appliance.

In some examples, the network-accessible location is a file transfer protocol server on the virtual imaging appliance.

In some examples, the installer software includes a switch image, and installing the hardware management system on the management switch includes storing the switch image on the management switch, rebooting the management switch, and installing on the management switch a hardware management system agent image obtained from the network-accessible location. In some examples, the hardware management system agent image is to instantiate the hardware management system on the management switch.

In some examples, installing the hardware management system on the management switch includes installing a dynamic host configuration protocol server on the management switch to assign Internet protocol addresses to the hardware for use in the virtual server rack.

In some examples, installing the hardware management system on the management switch includes starting a hardware management system agent daemon to discover the hardware in the physical rack.

In some examples, the instructions further cause the processor to determine whether the hardware in the physical rack is configured successfully.

In some examples, when the hardware in the physical rack is not configured successfully, the instructions further cause the processor to present a notification that the physical rack is not ready for delivery to a customer.

In some examples, installing the hardware management system on the management switch includes installing an out-of-band agent and an out-of-band plugin on the management switch. In some examples, the instructions are further to cause the processor to install a hardware management system service API, a hardware management system aggregator, an in-band agent, and an in-band plugin on a server host.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to install a hardware management system on a management switch, the method comprising:
    in response to a power-on event of a management switch, executing a boot loader on the management switch to boot an operating system on the management switch;
    communicating with a virtual imaging appliance to retrieve an Internet protocol address for use by the management switch, the management switch coupled to a rack of servers to carry management communications for the rack of servers, the virtual imaging appliance separate from the rack of servers and temporarily communicatively coupled to the management switch during initialization of the rack of servers;
    in response to booting the operating system, obtaining from the virtual imaging appliance in communication with the management switch a uniform resource locator of a network-accessible location of installer software to install the hardware management system on the management switch, the virtual imaging appliance to configure a physical rack of hardware for use as a virtual server rack, and the hardware management system to manage the hardware for use in the virtual server rack;
    transmitting a request for the installer software to the virtual imaging appliance;
    installing a switch image included in the installer software on the management switch;
    in response to installing the switch image, rebooting the management switch to activate the switch image;

in response to activation of the switch image, installing the hardware management system on the management switch using the installer software obtained from the network-accessible location; and initializing a dynamic host configuration protocol (DHCP) server on the management switch to serve Internet protocol addresses to computing devices in the rack of servers when the virtual imaging appliance is no longer connected.

2. A method as defined in claim 1, further including determining whether the hardware in the physical rack is configured successfully.

3. A method as defined in claim 2, wherein when the hardware in the physical rack is not configured successfully, presenting a notification that the physical rack is not ready for delivery to a customer.

4. A method as defined in claim 1, further including obtaining at the management switch the Internet protocol (IP) address from a second dynamic host configuration protocol server running on the virtual imaging appliance.

5. A method as defined in claim 1, wherein the network-accessible location is a file transfer protocol server on the virtual imaging appliance.

6. A method as defined in claim 1, wherein installing the hardware management system on the management switch includes:

installing on the management switch a hardware management system agent image obtained from the network-accessible location, the hardware management system agent image to instantiate the hardware management system on the management switch.

7. A method as defined in claim 1, wherein installing the hardware management system on the management switch includes starting a hardware management system agent daemon to discover the hardware in the physical rack.

8. A method as defined in claim 1, wherein installing the hardware management system on the management switch includes installing an out-of-band agent and an out-of-band plugin on the management switch, and the method further including installing a hardware management system service API, a hardware management system aggregator, an in-band agent, and an in-band plugin on a server host.

9. An apparatus to install a hardware management system on a management switch, the apparatus comprising:

a boot loader to, via a processor, boot an operating system on the management switch in response to a power-on event of the management switch;

the processor to:
communicate with a virtual imaging appliance to retrieve an Internet protocol address for use by the management switch, the management switch coupled to a rack of servers to carry management communications for the rack of servers, the virtual imaging appliance separate from the rack of servers and temporarily communicatively coupled to the management switch during initialization of the rack of servers;

in response to booting the operating system, obtain from the virtual imaging appliance in communication with the management switch a uniform resource locator of a network-accessible location of installer software to install the hardware management system on the management switch, the virtual imaging appliance to configure a physical rack of hardware for use as a virtual server rack, and the hardware management system to manage the hardware for use in the virtual server rack; and transmit a request for the installer software to the virtual imaging appliance; and an installer to:
install a switch image included in the installer software on the management switch;

in response to installing the switch image, reboot the management switch to activate the switch image;

in response to activation of the switch image, install the hardware management system on the management switch using the installer software obtained from the network-accessible location; and initialize a dynamic host configuration protocol (DHCP) server on the management switch to serve Internet protocol addresses to computing devices in the rack of servers when the virtual imaging appliance is no longer connected.

10. An apparatus as defined in claim 9, further including a verifier to determine whether the hardware in the physical rack is configured successfully.

11. An apparatus as defined in claim 10, wherein when the hardware in the physical rack is not configured successfully, the verifier is to present a notification that the physical rack is not ready for delivery to a customer.

12. An apparatus as defined in claim 9, wherein the processor is to obtain at the management switch the Internet protocol (IP) address from a second dynamic host configuration protocol server running on the virtual imaging appliance.

13. An apparatus as defined in claim 9, wherein the network-accessible location is a file transfer protocol server on the virtual imaging appliance.

14. An apparatus as defined in claim 9, wherein installing the hardware management system on the management switch includes:

installing on the management switch a hardware management system agent image obtained from the network-accessible location, the hardware management system agent image to instantiate the hardware management system on the management switch.

15. An apparatus as defined in claim 9, wherein installing the hardware management system on the management switch includes starting a hardware management system agent daemon to discover the hardware in the physical rack.

16. An apparatus as defined in claim 9, wherein installing the hardware management system on the management switch includes installing an out-of-band agent and an out-of-band plugin on the management switch, and the installer further to install a hardware management system service API, a hardware management system aggregator, an in-band agent, and an in-band plugin on a server host.

17. A non-transitory computer-readable medium comprising instructions that, when executed, cause a processor to at least:

in response to a power-on event of a management switch, execute a boot loader on the management switch to boot an operating system on the management switch;

communicate with a virtual imaging appliance to retrieve an Internet protocol address for use by the management switch, the management switch coupled to a rack of servers to carry management communications for the rack of servers, the virtual imaging appliance separate from the rack of servers and temporarily communicatively coupled to the management switch during initialization of the rack of servers;

in response to booting the operating system, obtain from the virtual imaging appliance in communication with the management switch a uniform resource locator of a network-accessible location of installer software to install a hardware management system on the management switch, the virtual imaging appliance to configure a physical rack of hardware for use as a virtual server rack, and the hardware management system to manage the hardware for use in the virtual server rack;

transmit a request for the installer software to the virtual imaging appliance;

install a switch image included in the installer software on the management switch;

in response to installing the switch image, reboot the management switch to activate the switch image;

in response to activation of the switch image, install the hardware management system on the management switch using the installer software obtained from the network-accessible location; and initialize a dynamic host configuration protocol (DHCP) server on the management switch to serve Internet protocol addresses to computing devices in the rack of servers when the virtual imaging appliance is no longer connected.

18. A non-transitory computer-readable medium as defined in claim 17, wherein the instructions further cause the processor to determine whether the hardware in the physical rack is configured successfully.

19. A non-transitory computer-readable medium as defined in claim 18, wherein when the hardware in the physical rack is not configured successfully, the instructions further cause the processor to present a notification that the physical rack is not ready for delivery to a customer.

20. A non-transitory computer-readable medium as defined in claim 17, wherein the instructions further cause the processor to obtain at the management switch the Internet protocol (IP) address from a second dynamic host configuration protocol server running on the virtual imaging appliance.

21. A non-transitory computer-readable medium as defined in claim 17, wherein the network-accessible location is a file transfer protocol server on the virtual imaging appliance.

22. A non-transitory computer-readable medium as defined in claim 17, wherein installing the hardware management system on the management switch includes:

storing the switch image on the management switch.

23. A non-transitory computer-readable medium as defined in claim 17, wherein installing the hardware management system on the management switch includes starting a hardware management system agent daemon to discover the hardware in the physical rack.

24. A non-transitory computer-readable medium as defined in claim 17, wherein installing the hardware management system on the management switch includes installing an out-of-band agent and an out-of-band plugin on the management switch, and the instructions to further cause the processor to install a hardware management system service API, a hardware management system aggregator, an in-band agent, and an in-band plugin on a server host.

* * * * *